US012663633B1

(12) United States Patent　　　　(10) Patent No.:　US 12,663,633 B1

Olsson et al.　　　　　　　　　　　(45) Date of Patent:　**\*Jun. 23, 2026**

(54) DOCKABLE CAMERA REEL AND CAMERA CONTROL UNIT (CCU) SYSTEM

(71) Applicant: SeeScan, Inc., San Diego, CA (US)

(72) Inventors: Mark S. Olsson, La Jolla, CA (US); Michael J. Martin, San Diego, CA (US); Alexander L. Warren, Escondido, CA (US); Garrett A. Newby, San Diego, CA (US); Gina M. Hartman, San Diego, CA (US)

(73) Assignee: SeeScan, Inc., San Diego, CA (US)

( \* ) Notice: Subject to any disclaimer, the term of this patent is extended or adjusted under 35 U.S.C. 154(b) by 15 days.

This patent is subject to a terminal disclaimer.

(21) Appl. No.: 18/946,907

(22) Filed: Nov. 13, 2024

Related U.S. Application Data

(63) Continuation of application No. 18/121,547, filed on Mar. 14, 2023, now Pat. No. 12,153,205, which is a continuation of application No. 17/190,400, filed on Mar. 3, 2021, now Pat. No. 11,614,613.

(60) Provisional application No. 62/984,768, filed on Mar. 3, 2020.

(51) Int. Cl.
　　*G02B 23/24*　　　　(2006.01)
(52) U.S. Cl.
　　CPC ..... *G02B 23/2484* (2013.01); *G02B 23/2446* (2013.01)

(58) Field of Classification Search
　　CPC ............ G02B 23/2446; G02B 23/2476; G02B 23/2484
　　USPC ........................................................ 348/65
　　See application file for complete search history.

(56)　　　　　　　References Cited

U.S. PATENT DOCUMENTS

| | | | | |
|---|---|---|---|---|
| 10,084,945 B1 * | 9/2018 | Olsson | ................. | G01N 21/954 |
| 10,863,064 B1 * | 12/2020 | Olsson | ...................... | E03F 7/12 |
| 11,528,401 B1 * | 12/2022 | Olsson | ................... | H04N 23/66 |
| 11,614,613 B2 * | 3/2023 | Olsson | ................. | G03B 37/005 |
| | | | | 348/65 |
| 12,153,205 B1 * | 11/2024 | Olsson | ................. | G03B 37/005 |
| 2012/0057010 A1 | 3/2012 | Yamauchi | | |

FOREIGN PATENT DOCUMENTS

WO　　　　2015031407 A1　　3/2015

OTHER PUBLICATIONS

International Searching Authority, "Written Opinion of the International Searching Authority" for PCT Patent Application PCT/US21/020764, Mar. 3, 2021, European Patent Office, Munich.

\* cited by examiner

*Primary Examiner* — Behrooz M Senfi

(74) *Attorney, Agent, or Firm* — Steven C. Tietsworth, Esq.; Michael J. Pennington, Esq.

(57)　　　　　　　ABSTRACT

Video inspection systems with moveably dockable camera control units (CCUs) which may include a display are disclosed.

16 Claims, 21 Drawing Sheets

DOCKABLE CAMERA REEL AND CAMERA CONTROL UNIT (CCU) SYSTEM

CROSS-REFERENCE TO RELATED APPLICATIONS

This application claims priority under 35 U.S.C. § 119 (e) to U.S. Provisional Patent Application Ser. No. 62/984,768, entitled DOCKABLE CAMERA REEL AND CCU SYSTEM, filed Mar. 3, 2020, the content of which is incorporated by reference herein in its entirety for all purposes.

FIELD

This disclosure relates generally to systems and methods for viewing and transporting video/image displays and/or camera control units (CCUs) used with camera and cable storage drum-reels in pipe or cavity inspection systems. More specifically, but not exclusively, this disclosure relates to systems and methods for providing a support for a video/image display and/or camera control unit that can be configured in a wide variety of positions for convenience and ease of viewing. Various embodiments may include docking mechanisms to allow for the use of an off the shelf tablet, pad, lap top, smart phone, or the like. One such example is manufactured by RAM MOUNT®. Many other manufacturers exist and are well known.

BACKGROUND

Cable storage drums used to contain push-cables with inspection cameras made to interface with a camera control unit (also referred to hereafter as a CCU) for viewing, storing, and/or controlling data and/or video feeds from the inspection camera are known in the art. Many such cable storage drums secure a CCU thereto in a fixed position for use in utility inspection operations. For example, European Patent EP 1,091,159B1, entitled CAVITY INSPECTION DEVICE WITH VIDEO CAMERA, which is incorporated by reference herein, describes an inspection device wherein a monitor for displaying video captured by a video camera is fixed in place with respect to the device frame. These locks or other mechanisms used to secure the CCU about a cable storage drum tend to be cumbersome for a user to operate during normal use. Furthermore, existing configurations of cable storage drums with attached CCUs tend to remain fixed in position relative to the frame of the cable storage drum, neglecting a user's need to angle the CCU for ease in viewing during use.

In another example, U.S. Pat. No. 9,521,303 B2, entitled CABLE STORAGE DRUM WITH MOVEABLE CCU DOCKING APPARATUS, which is also hereby incorporated by reference herein, describes a CCU docking mechanism, wherein the CCU can be docked with a cable storage drum for viewing or transport or can be undocked and put in a standalone position for viewing. However, the undocked CCU can only be put in a minimal number of positions and orientations, thereby not always offering an optimal view to a user. Accordingly, there is a need in the art to address the above-described as well as other problems.

SUMMARY

The present disclosure relates generally to video inspection systems including a camera control unit (CCU) including a display, a frame, a cable storage drum-reel coupled to the frame to store a push-cable, and an inspection camera coupled to the push cable, where the inspection system allows the CCU to removably dock to the frame so that the CCU and associated display/monitor remains moveable relative to the frame, such as to allow a user to pivot the CCU and display up or down during use. The CCU can be removably docked to the frame in multiple positions and orientations. When the frame is removed from the drum-reel, the frame may be adjusted to allow an attached CCU to be set at different positions and orientations, e.g. different heights, viewing angles, etc. Various embodiments may include docking mechanisms to allow for the use of an off the shelf tablet, pad, lap top, smart phone, or the like.

Embodiments of a dockable camera reel and CCU system in accordance with aspects of the present disclosure may include a drum element which may further contain a push-cable and inspection camera. The drum element may secure to a frame element configured to remain stationary, while allowing the drum to rotate when dispensing the push-cable into a pipe or other cavity. A docking apparatus may further secure to the frame. The docking apparatus may allow a CCU to dock in a manner allowing the CCU to be moveable in relation to the frame element and/or drum element and/or mountable in two or more orientations, such as oppositely oriented relative to the frame and/or oriented in a vertical or horizontal orientation. The docking apparatus may include one or more docking elements or mechanisms coupled to the frame and/or drum element to detachably receive the CCU. The docking apparatus may include one or more elements on or coupled to the CCU to facilitate removable attachment to the frame and/or drum.

For example, in one aspect, the docking apparatus may include a set of docking elements or mechanisms to allow the user to readily dock and/or undock the CCU with a drum and frame. Such docking elements may allow the CCU to snap into place when docking. The docking element may allow for pre-loading so that the CCU docks with relative ease by being partially engaged with a contact or snap-action completing engagement. The CCU may further be configured to pivot about the docking mechanisms. Pivoting may be done via a pivoting or rotational axis, and attachment knobs or dials may be rotatable in opposing directions about the release axis to undock the CCU from the frame.

In another aspect, the docking apparatus may automatically reset into a docking ready state upon undocking the CCU, such as through pre-loading. For example, when a user undocks the CCU from a drum and frame, a docking mechanism may reset into a docking ready state such that when the CCU is again docked with the frame via the docking apparatus, the CCU readily snaps back into a docked position.

In another aspect, the CCU may remain oriented at a particular angle or position until a force, generally imparted intentionally by a user, is made to make the CCU pivot or otherwise move. This may be done using a frictional element. A pivot point positioned high upon the docking apparatus, the use of wave springs, conical spring washers, and/or other tensioning or frictional mechanisms may be used to provide the self-supported ability to angle/position the CCU as desired. Many such frictional elements are known in the art. In another aspect, the CCU may remain oriented at a particular angle or position until a force, generally imparted intentionally by a user, is made to make the CCU pivot or otherwise move. This may be done using a frictional element. A pivot point positioned high upon the docking apparatus, the use of wave springs, conical spring washers, and/or other tensioning or frictional mechanisms may be used to provide the self-supported ability to angle/ position the CCU as desired.

In another aspect, the center of gravity of the CCU may be centered at or proximate to a central movable axis of the cable storage drum such that a drum and frame with docking apparatus, which may be positioned in an assortment of different ways during use, may balance so that it will not readily be tipped over during use.

In another aspect, a drum and frame with docking apparatus may be readily carried by a user while the CCU is docked. The CCU may remain docked to the frame via the docking apparatus during transport such that a user need only grasp one location on the drum and frame with docking apparatus. The CCU may contain multiple handles providing the user options in how best to carry the drum and frame with docking apparatus. The CCU may rotate about a central movable axis during transportation.

In another aspect, the disclosure relates to a video inspection system. The system may include, for example, a frame element. The system may include a camera control unit (CCU). The CCU may include electronics associated with controlling an inspection camera, and for providing images generated from the camera to a display element. The system may include a docking apparatus. The docking apparatus may be mechanically coupled to the frame element and/or the CCU so as to allow the CCU to rotate relative to the frame, about a rotational axis, responsive to a user action. The user action may be a user-applied force. The user-applied force may be a push or pull force applied to the CCU.

In another aspect, the frame may include multiple frame elements for supporting and/or carrying a CCU. As an example, an inner frame element and an outer frame element may be configured such that the inner frame element is free to rotate 360 degrees within the outer frame element. The two frame elements may be connected to each other with rotating elements which may include a frictional component to allow the two frame elements to retain an angled or upright self-supporting position. The frame elements may include one or more handles for carrying the frame with or without the CCU attached. The handles may also provide a stable base for supporting the frame with or without the CCU attached. The handles may include slip resistant components to prevent or reduce movement of the frame elements once positioned on a surface.

In another aspect, one of the frame elements may be curved, angled, or shaped, etc. such that the CCU or a tablet, pad, laptop, smart phone, or the like, may be set on the edge of a table, desk, counter, ledge, or other substantially flat surface edge.

In another aspect, the CCU may be configured with a docking mechanism and at least one of the frame elements may be configured with a crossmember such that it can attach to the CCU via the docking mechanism. The docking mechanism may be configured such that the CCU can be removably attached on top of the crossmember, or in either the forward or backward direction on the bottom of the crossmember.

In another aspect, at least one of the frame elements may be configured to dock with an adjustable mounting device configured for removably mounting, orienting and positioning a tablet, pad, laptop, smartphone, or the like.

In another aspect, the frame may include a battery docking apparatus for removably attaching a battery which may be configured to supply power to a tablet, pad, laptop, smartphone, or the like via a removably attachable power cable.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1A:
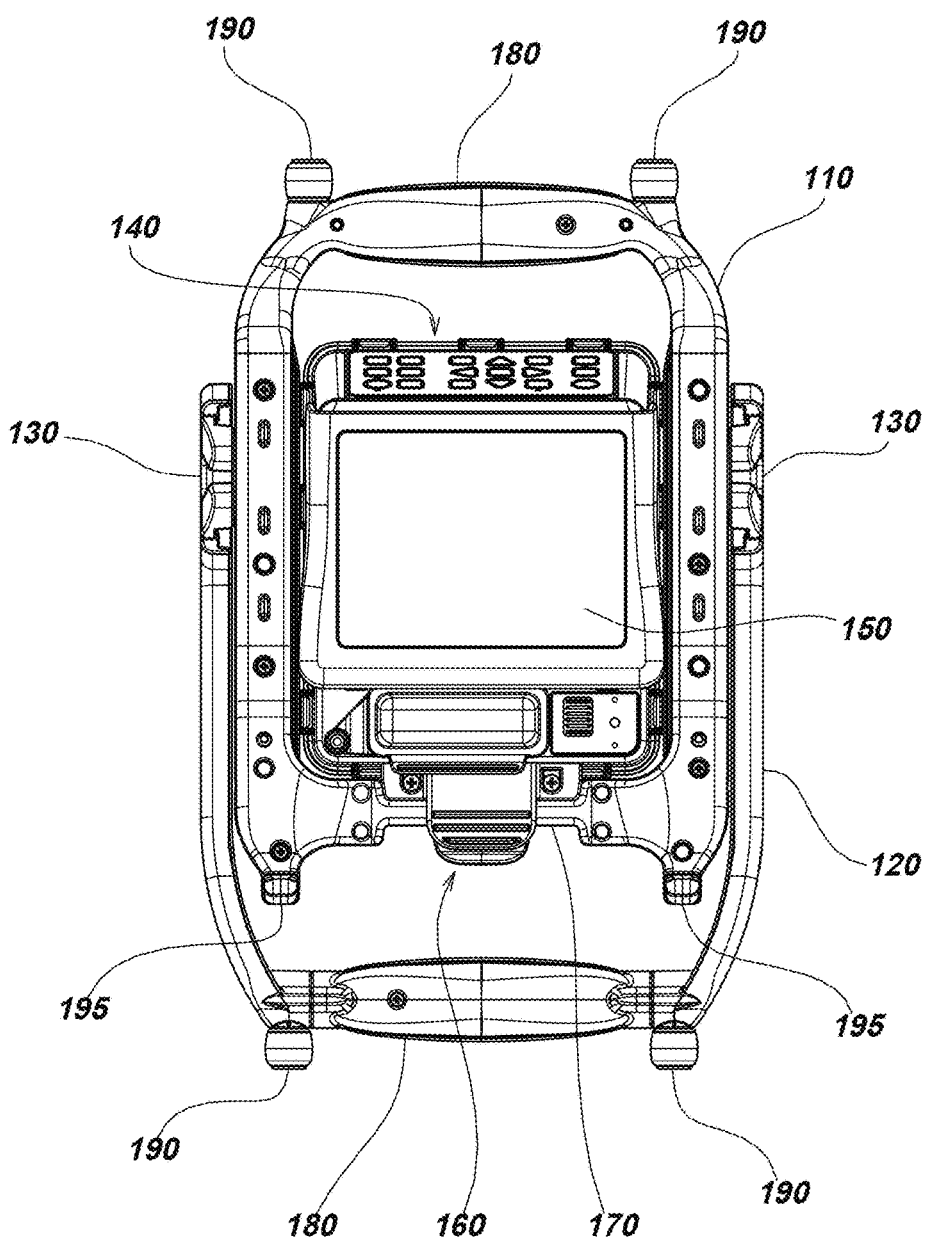
FIG. 1A is a front view of an embodiment of a CCU attached to a frame via a docking apparatus.

The present disclosure relates generally to video inspection systems including a frame, camera control unit (CCU) coupled to the frame, cable storage drum coupled to the frame to store a push-cable, and an inspection camera coupled to the push cable, where the inspection system allows the CCU to removably dock to the frame so that the CCU and associated display/monitor remains moveable relative to the frame, such as to allow a user to pivot the CCU and display up or down during use. The CCU may be rotatable relative to the frame and/or attachable to the frame in two or more positions in either of a vertical and/or a horizontal orientation of the system.

Embodiments of a drum and frame with docking apparatus in accordance with aspects of the present disclosure may include a drum element which may further contain a push-cable and inspection camera. The drum element may secure to a frame element configured to remain stationary, while allowing the drum to rotate when dispensing the push-cable into a pipe or other conduit. A docking apparatus may further secure to the frame. The docking apparatus may allow a CCU to dock in a manner allowing the CCU to be moveable in relation to the frame element and/or drum element and/or mountable in two or more orientations, such as oppositely oriented relative to the frame and/or oriented in a vertical or horizontal orientation. The docking apparatus may include one or more docking elements or mechanisms coupled to the frame and/or drum element to detachably receive the CCU. The docking apparatus may include one or more elements on or coupled to the CCU to facilitate removable attachment to the frame and/or drum.

For example, in one aspect, the docking apparatus may include a set of docking elements or mechanisms to allow the user to readily dock and/or undock the CCU with a drum and frame. Such docking elements may allow the CCU to snap into place when docking. The docking element may allow for pre-loading so that the CCU docks with relative ease by being partially engaged, with a contact or snap-action completing engagement. The CCU may further be configured to pivot about the docking mechanisms. Pivoting may be done via a pivoting or rotational axis, and attachment knobs or dials may be rotatable in opposing directions about the release axis to undock the CCU from the frame.

In another aspect, the docking apparatus may automatically reset into a docking ready state upon undocking the CCU, such as through pre-loading. For example, when a user undocks the CCU from a drum and frame, a docking mechanism may reset into a docking ready state such that when the CCU is again docked with the frame via the docking apparatus, the CCU readily snaps back into a docked position.

In another aspect, the CCU may remain oriented at a particular angle or position until a force, generally imparted intentionally by a user, is made to make the CCU pivot or otherwise move. This may be done using a frictional element. A pivot point positioned high upon the docking apparatus, the use of wave springs, conical spring washers, and/or other tensioning or frictional mechanisms may be used to provide the self-supported ability to angle/position the CCU as desired.

In another aspect, the center of gravity of the CCU may be centered at or proximate to a central movable axis of the cable storage drum such that a drum and frame with docking apparatus, which may be positioned in an assortment of different ways during use, may balance so that it will not readily be tipped over during use.

In another aspect, a drum and frame with docking apparatus may be readily carried by a user while the CCU is docked. The CCU may remain docked to the frame via the docking apparatus during transport such that a user need only grasp in one location on the drum and frame with docking apparatus. The CCU may contain multiple handles providing the user options in how best to carry the drum and frame with docking apparatus. The CCU may rotate about a central movable axis during transportation.

In another aspect, the disclosure relates to a video inspection system. The system may include, for example, a frame element. The system may include a camera control unit (CCU). The CCU may include electronics associated with controlling an inspection camera, and for providing images generated from the camera to a display element. The system may include a docking apparatus. The docking apparatus may be mechanically coupled to the frame element and/or the CCU so as to allow the CCU to rotate relative to the frame, about a rotational axis, responsive to a user action. The user action may be a user-applied force. The user-applied force may be a push or pull force applied to the CCU.

The docking apparatus may, for example, further detachably affix the CCU to the frame. The docking apparatus may detachably fix the CCU to the frame via a latching element or mechanism. The latching element or mechanism may include a pair of knobs rotational about a release axis. The knobs may move away from the frame upon a user release actuation.

The docking apparatus may, for example, include a frictional element for restraining rotation of the CCU. The frictional element may retain the CCU in angled or upright self-supporting position.

The system may, for example, further include a cable storage drum coupled to the frame element. The system may further include a push-cable. The push-cable may be disposed at least partially in an internal volume of the cable storage drum. The system may further include a camera head. The camera head may be mechanically coupled to a distal end of the push-cable, and may be electronically coupled to the CCU. The camera head may be a self-leveling camera head. The system may further include a camera guide and securing mechanism.

The frame may include multiple frame elements for supporting and/or carrying a CCU. As an example, an inner frame element and an outer frame element may be configured such that the inner frame element is free to rotate 360 degrees within the outer frame element. The two frame elements may be connected to each other with rotating elements which may include a frictional component to allow the two frame elements to retain an angled or upright self-supporting position. The frame elements may include one or more handles for carrying the frame with or without the CCU attached. The handles may also provide a stable base for supporting the frame with or without the CCU attached. The handles may include slip resistant components to prevent or reduce movement of the frame elements once positioned on a surface.

The frame may include a crossmember for receiving a CCU via another docking apparatus attached to the CCU. The crossmember may include substantially symmetrical indentations or grooves on multiple sides, e.g. top, bottom, front and back, for allowing a CCU to be removably attached via a docking apparatus which may, in one embodiment be a flexible member that can be attached, e.g. clipped securely to the crossmember to engage with the indentations or grooves. In some embodiments, the CCU may be attached in multiple directions and/orientations relative to the crossmember. For instance, in some embodiments the CCU may be removably attached via the flexible member in either a forward or backward direction on top of the crossmember, or in either the forward or backward direction on the bottom of the crossmember. In an embodiment, the crossmember may be configured to remain stationary relative to the inner frame. In an alternate embodiment, the crossmember may be configured to be rotatable relative to the inner frame.

In an alternate embodiment, the outer frame may be configured such that both frame elements, with or without a docked CCU or a tablet, pad, laptop, smart phone, or the like, may be set on the edge of a table, desk, counter, ledge, or other edge. In one embodiment, the outer frame may be curved, angled, or shaped to allow the outer frame element to rest or balance on an edge. The inner frame can be moved in different positions relative to the outer frame to allow a docked CCU or a tablet, pad, laptop, smart phone, or the like, to balance on the edge of a table, desk, counter, ledge, or other edge device. In this embodiment, the weight and position of an attached CCU or a tablet, pad, laptop, smart phone, or the like, depending on the orientation of the inner frame element relative to the outer frame element, would provide a counter balance for the frame elements to allow them to rest on an edge. The various types, surfaces, shapes, etc. of a table, desk, counter, ledge, or other edge are well known to those skilled in the art. It would be obvious to one skilled in the art that configuring the frame elements to rest or balance on an edge could be accomplished in other ways, including but not limited to bumps, indentations or grooves, etc. configured on one or both of the frame elements and/or using slip resistant elements on one or both of the frame elements.

In another embodiment, one or more slip resistant components may be provided on one or both of the frame elements to provide a stable base when the frame elements are set on a surface with or without an attached CCU or a tablet, pad, laptop, smart phone, or the like. In some embodiments the slip resistant components may include feet, bumps, or other protrusions made of rubber or other suitable slip resistant material. The slip resistant components may be part of, or attached to, one or more of the frame handles or part of or placed on other parts of the frame elements.

In another embodiment, an adjustable mounting device may be provided for holding a tablet, pad, laptop, smartphone, or the like. Many off-the-shelf mounting devices are available for this purpose. In one embodiment, the adjustable mounting device may have one or more elements that can be moved into place to support a tablet, pad, laptop, smartphone, or the like. The adjustable mounting device may be attached to one or more frame elements via a docking apparatus. In one embodiment, a base plate with a ball connector may be attached to the adjustable mounting device and another base plate with a ball connector may be attached to the crossmember of the inner frame. A tube style connector with two halves forming a tube with two opposing open ends and an adjustment mechanism may be provided for connecting the ball connectors, thereby allowing the adjustable mounting device to be docked to the inner frame element. The ball connector allows the mounting device to be put in many different positions by using the adjustment mechanism.

In some embodiments, a display, which may include a tablet, pad, laptop, smartphone, or the like, may, as is well known in the art, include an accelerometer or other device/technology to allow a displayed image to automatically orient itself in the proper upright viewing direction of a user. Therefore a user, in some embodiments, may be able to simply flip over, and or adjust, one or both frame elements and would be able to automatically see the correct display without having to adjust or reorient the tablet, pad, laptop, smartphone, or the like.

In another embodiment, a battery docking element may be provided to enable storage or usage of a battery. The battery may provide power to a docked or undocked CCU or a tablet, pad, laptop, smart phone, or the like. A cable storage for excess cable, and/or a cable not being used, may be provided and attached to one or both frame elements. In some embodiments, ports and/or connectors may be provided to allow one or more batteries from one or more apparatus 100 to be linked together to provide additional power as necessary. In some embodiments, ports and/or connectors may be provided to allow one or more batteries to wirelessly provide power to nearby devices. Wireless power may be provided via Qi, Apple MagSafe®, near field, and other wireless power protocols/standards.

The docking apparatus for docking the frame elements with a cable drum (also called a drum-reel) may, for example, include a knob or knobs rotatable on a release axis to release the CCU from attachment to the frame element. The rotational axis and the release axis may be common axes. The knob or knobs may be further movable outward relative to the frame upon a user release actuation. The user release actuation may be a rotation of the knob or knobs about a release axis.

The system may, for example, further include a latch indicator to indicate a state of the docking apparatus. The state may be an open or released state or a closed or locked state. The latch indicator may indicate a state, such as an open or released state, responsive to a user release action of the knob. The user release action may be a rotation of the knob or knobs about the release axis. The indicator may include a visual indicator of a docking apparatus in an open or released state or docking apparatus in a closed or locked state. The state or states may be indicated by a colored band.

The docking apparatus may be configured to be placed in a docking ready state upon removal of the CCU. The removal of the CCU may be responsive to a user release action. The user release action may be a rotation of a knob or knobs about a release axis.

The center of mass of the frame and drum assembly may, for example, be positioned below the rotational axis.

Various additional aspects, features, and functions are described below in conjunction with FIGS. 1 through 18 of the appended Drawings. In addition to the specific embodiments described subsequently herein, in various alternate embodiments features or elements of the specific embodiments may be combined to implement the same or similar functionality. Accordingly, elements of one embodiment may be combined with elements of other embodiments to implement additional embodiments within the spirit and scope of the present invention.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

In operation, the CCU or tablet, pad, laptop, smartphone, or the like may be removably coupled to the frame (and/or coupled drum) via a docking apparatus such that they can be moved and/or rotated by an operator to adjust viewing angle or positioning of the display via a user action such as a push or pull on the CCU or tablet, pad, laptop, smartphone, or the like, and/or may be readily released and reattached, such as by a user action of twisting one or more knobs to put the docking apparatus into a released state, which may be indicated by a latch indicator. The CCU or tablet, pad, laptop, smartphone, or the like and frame may cooperate with the docking apparatus so that the device can be readily removed from the frame using a latch element or assembly or other retaining mechanism configured for rotating the CCU or tablet, pad, laptop, smartphone, or the like, and/or may be readily attaching or releasing the CCU, such as through a pre-loading element or mechanism, to provide a snap-on attachment action.

The disclosures herein may be combined with the disclosures of other co-assigned pipe inspection system patent applications and patents in various additional pipe inspection system and pipe and sonde locating system embodiments. The co-assigned applications and patents include U.S. Utility patent application Ser. No. 16/133,648, entitled CABLE STORAGE DRUM WITH MOVEABLE CCU DOCKING APPARATUS, filed Sep. 17, 2018, which is a continuation of and claims priority to U.S. Utility patent application Ser. No. 15/369,693, now U.S. Pat. No. 10,084,945, entitled CABLE STORAGE DRUM WITH MOVEABLE CCU DOCKING APPARATUS, filed Dec. 5, 2016, which is a continuation of and claims priority to U.S. Utility patent application Ser. No. 14/469,536, now U.S. Pat. No. 9,521,303, entitled CABLE STORAGE DRUM WITH MOVEABLE CCU DOCKING APPARATUS, filed Aug. 26, 2014, which claims priority under 35 U.S.C. § 119 (e) to U.S. Provisional Patent Application Ser. No. 61/870,232 entitled CABLE STORAGE DRUM WITH MOVABLE CCU DOCKING APPARATUS, filed Aug. 26, 2013 as well as to U.S. Provisional Patent Application Ser. No. 61/926, 382, entitled CABLE STORAGE DRUM WITH MOVABLE CCU DOCKING APPARATUS, filed Jan. 12, 2014, U.S. Utility patent application Ser. No. 14/033,349, entitled VIDEO PIPE INSPECTION SYSTEMS WITH SNAP-ON PIPE GUIDES, filed Sep. 20, 2013, now U.S. Pat. No. 10,935,880, U.S. Utility patent application Ser. No. 12/371, 540, entitled PUSH-CABLE FOR PIPE INSPECTION SYSTEM, filed Feb. 13, 2009, now U.S. Pat. No. 8,289,385, U.S. Utility patent application Ser. No. 16/030,635, entitled PIPE INSPECTION SYSTEMS WITH ASYMMETRIC DRAG FORCE BEARINGS, filed Jul. 9, 2018, now U.S. Pat. No. 10,907,690, U.S. Utility patent application Ser. No. 16/453,965, entitled HIGH BANDWIDTH VIDEO PUSH-CABLES FOR PIPE INSPECTION SYSTEMS, filed Jun. 26, 2019, now U.S. Pat. No. 10,855,950, U.S. Utility patent application Ser. No. 15/919,077, entitled PORTABLE PIPE INSPECTION SYSTEMS AND METHODS, filed Mar. 12, 2018, now U.S. Pat. No. 10,834,364, U.S. Utility patent application Ser. No. 16/009,130, entitled SELF-LEVELING CAMERA HEADS, filed Jun. 14, 2018, now U.S. Pat. No. 10,715,703, Unites States Utility patent application Ser. No. 14/203,485, entitled PIPE INSPECTION CABLE COUNTER AND OVERLAY MANAGEMENT SYSTEM, filed Mar. 10, 2014, now U.S. Pat. No. 10,527,402, U.S. Utility patent application Ser. No. 14/935,878, entitled INSPECTION CAMERA DEVICES AND METHOD WITH SELECTIVELY ILLUMINATED MULTISENSOR IMAGING, filed Nov. 9, 2015, now U.S. Pat. No. 10,440,332, U.S. Utility patent application Ser. No. 15/728,410, entitled PIPE INSPECTION SYSTEM WITH JETTER PUSH-CABLE, filed Oct. 9, 2017, now U.S. Pat. No. 10,359,368, U.S. Utility patent application Ser. No. 14/949,868, entitled BURIED OBJECT LOCATORS WITH DODECAHEDRAL ANTENNA NODES, filed Nov. 23, 2015, now U.S. Pat. No. 10,078,149, U.S. Utility patent application Ser. No. 13/346,668, entitled PORTABLE CAMERA CONTROLLER PLATFORM FOR USE WITH PIPE INSPECTION SYSTEM, filed Jan. 9, 2012, now U.S. Pat. No. 10,001,425, U.S. Utility patent application Ser. No. 14/846,623, entitled PIPE INSPECTION SYSTEM CAMERA HEADS, filed Sep. 4, 2015, now U.S. Pat. No. 9,824,433, U.S. Utility patent application Ser. No. 13/358,463, entitled SELF-LEVELING INSPECTION SYSTEMS AND METHODS, filed Jan. 25, 2012, now U.S. U.S. Pat. No. 9,927,368, U.S. Utility patent application Ser. No. 14/154,128, entitled UTILITY LOCATOR SYSTEMS AND METHODS, filed Jan. 13, 2014, now U.S. Pat. No. 9,703,002, U.S. Utility patent application Ser. No. 14/034,293, entitled PIPE MAPPING SYSTEMS AND METHODS, filed Sep. 23, 2013, now U.S. Pat. No. 9,041,794, U.S. Utility patent application Ser. No. 12/399,859, entitled PIPE INSPECTION SYSTEM WITH SELECTIVE IMAGE CAPTURE, filed Mar. 9, 2009, now U.S. Pat. No. 8,395,662, U.S. Utility patent application Ser. No. 12/902,551, entitled OMNIDIRECTIONAL SONDE AND LINE LOCATOR, filed Oct. 12, 2010, now U.S. Pat. No. 8,035,390, and U.S. Utility patent application Ser. No. 10/886,856, entitled SONDES FOR LOCATING UNDERGROUND PIPES AND CONDUITS, filed Jul. 8, 2004, now U.S. Pat. No. 7,221,136. The content of each of these applications is incorporated by reference herein in its entirety. Various such additional combined embodiments may include, for example, pipe inspection systems and elements and sub-systems thereof, as well as sonde locating systems combining pipe inspection systems, sondes, and utility locating devices.

Various embodiments allow a user to easily and conveniently view a CCU or tablet, pad, laptop, smartphone, or the like CCUs, by adjusting the position and/orientation of one or both of the frame elements and/or one or more of the provided docking apparatus. The teachings herein, and the following embodiments are provided as examples. However, other embodiments within the spirit and scope of the present invention may be implemented in combinations of the disclosed details and aspects herein and/or in combinations with the patent documents incorporated by reference herein or in conjunction with similar or equivalent elements that are not explicitly disclosed.

EXAMPLE EMBODIMENTS

Figure 1B:
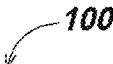
FIG. 1B is a side view of an embodiment of a CCU attached to a frame via a docking apparatus.
Figure 1B:
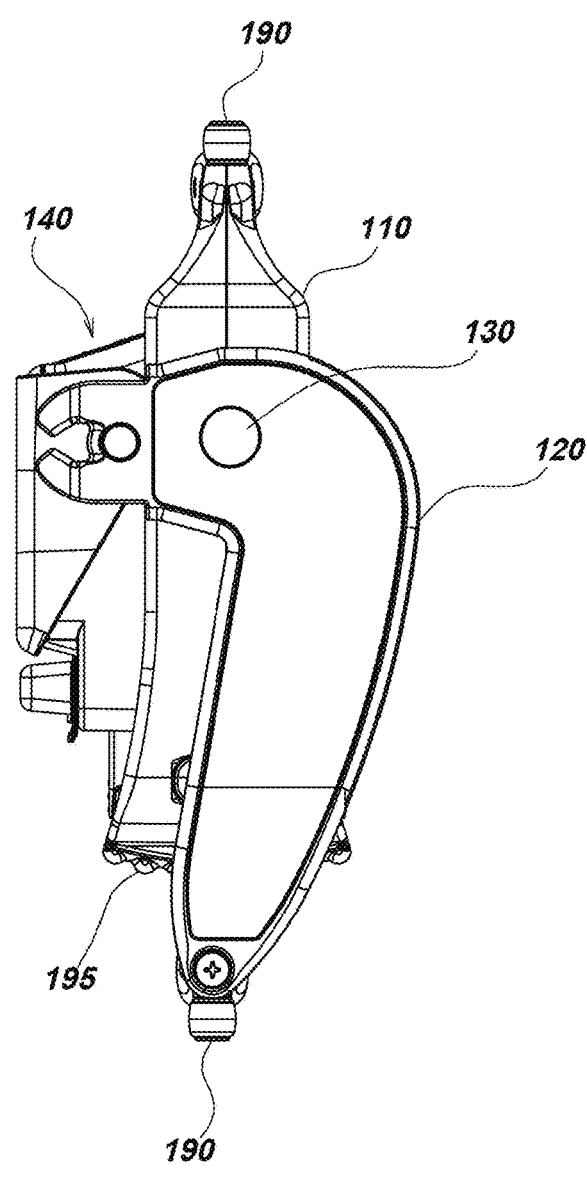
Figure 1C:
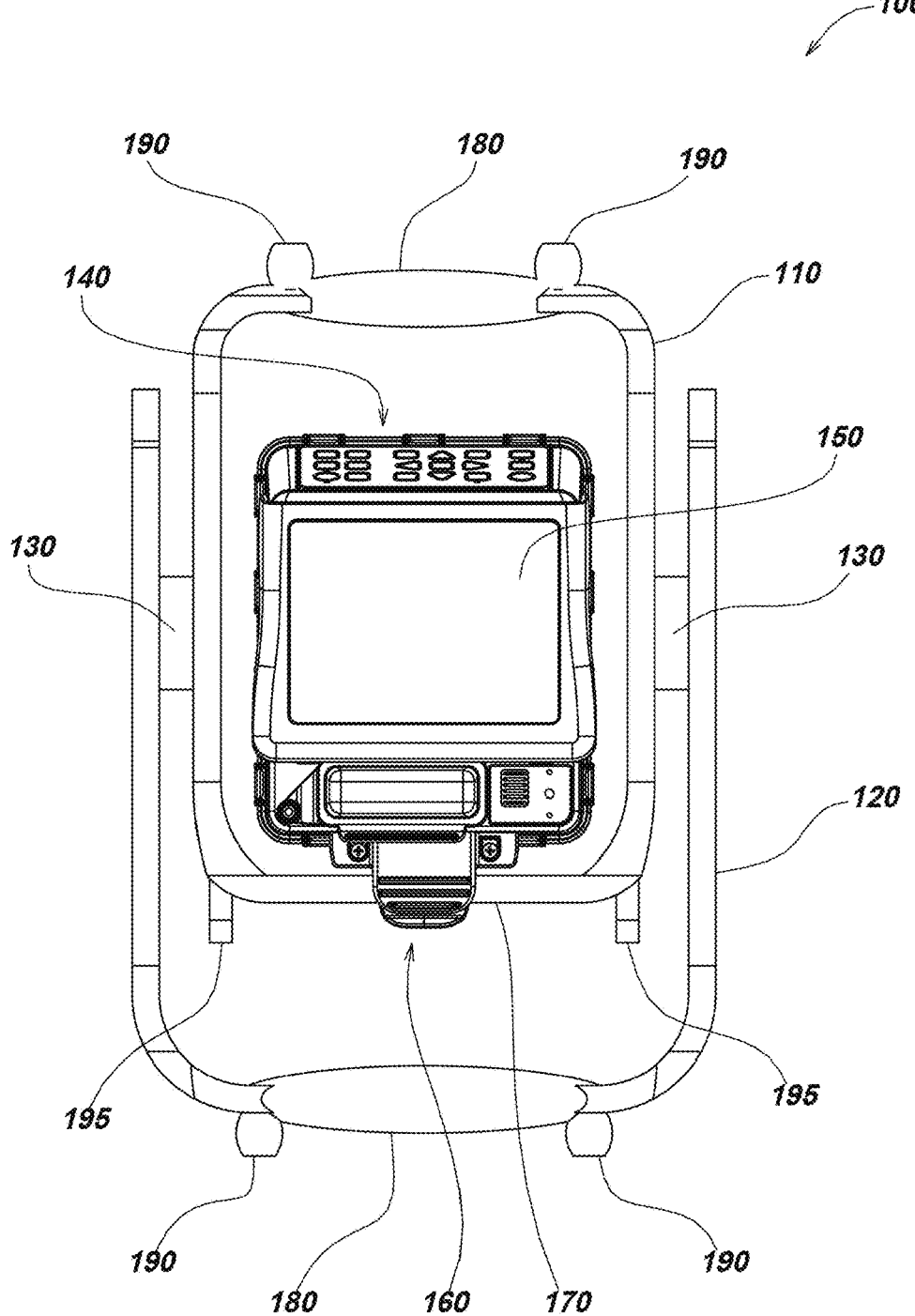
FIG. 1C is a conceptual front view of an embodiment of a CCU attached to a frame via a docking apparatus.

FIGS. 1A, 1B, and 1C illustrate an exemplary embodiment 100 of an apparatus for storing, carrying, and positioning a camera control unit (CCU) 140 which includes a display 150. An inner frame element 110 may be attached to an outer frame element 120 with rotating elements 130 which allow inner frame 110 and outer frame 120 to rotate 360 degrees relative to each other with or without a CCU 140 attached. Rotating elements 130 may include frictional components (not shown) to retain the inner frame element 110 and outer frame element 120 in an angled or upright self-supporting position. A first docking apparatus 160 may be provided for removably attaching the CCU 140 to a crossmember 170 of the inner frame element 110. Handles 180 may be provided for carrying the apparatus 100 with or without a CCU 140 docked. Slip resistant components such as rubber feet 190 and/or grooves 195 may be provided.

Figure 2:
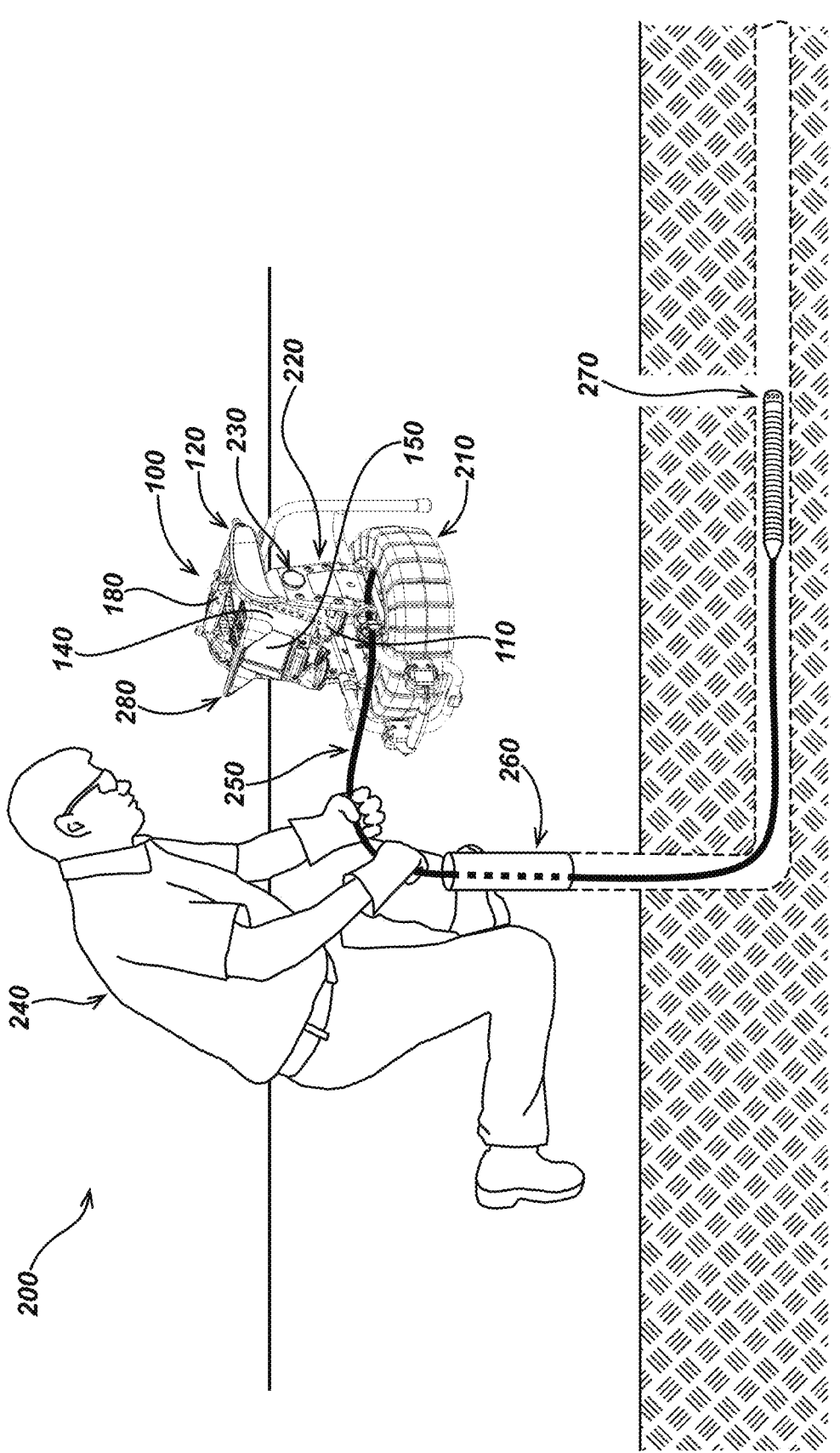
FIG. 2 is an embodiment illustrating a dockable camera reel and CCU system with a CCU and frame docked to a camera reel.

FIG. 2 is an exemplary embodiment of a dockable camera reel and CCU system 200 illustrating details of a CCU 140 attached to inner frame element 110 and docked to a camera cable drum-reel 210. Outer frame element 120 may have a docking element (not shown) for attaching to drum-reel frame 220. Docking and undocking of inner frame element 110 may be controlled by drum-reel frame knob 230. FIG. 2 shows a user 240 deploying a camera cable 250 into a pipe or cavity 260. Camera cable 250 may be connected to camera 270 which may be controlled with CCU 140, and pictures or images may be viewed via display 150. The camera cable 250 and the camera 270 may be deployed and/or stored on drum-reel 210. In some embodiments, a sun visor/screen protector 280 may be provided. The sun visor/ screen protector 280 is shown in an open (up position) but may be configured to adjust to different angles or positions, e.g., open (up position) or closed (down position). The sun visor/screen protector 280 may be positioned continuously with respect to the screen of display 150. A locking mechanism may be provided to keep visor/screen protector 280 in a closed position.

Figure 3:
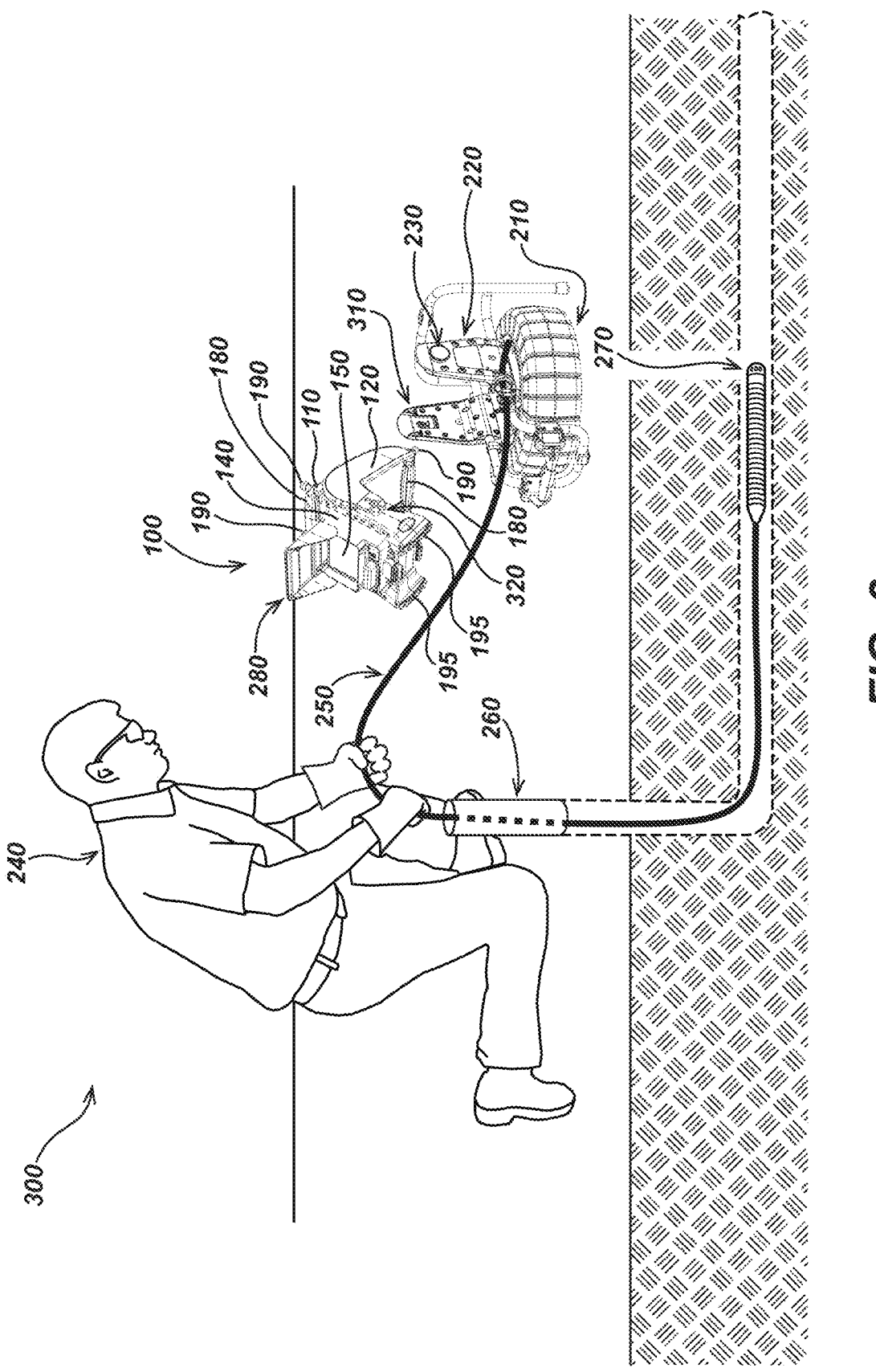
FIG. 3 is an embodiment illustrating a dockable camera reel and CCU system with a CCU and frame undocked from a camera reel.

FIG. 3 illustrates details of an exemplary embodiment of a dockable camera reel and CCU system 300 illustrating details of a CCU 140 attached to frame elements 110 and 120 and in an undocked position, e.g. not attached to camera cable drum-reel 210. In this embodiment, if docking of frame elements 110 and 120 to cable drum-reel 210 is desired (with or without CCU 140 attached), drum-reel frame docking apparatus 310 is configured to mate with outer frame docking apparatus 320.

Figure 4:
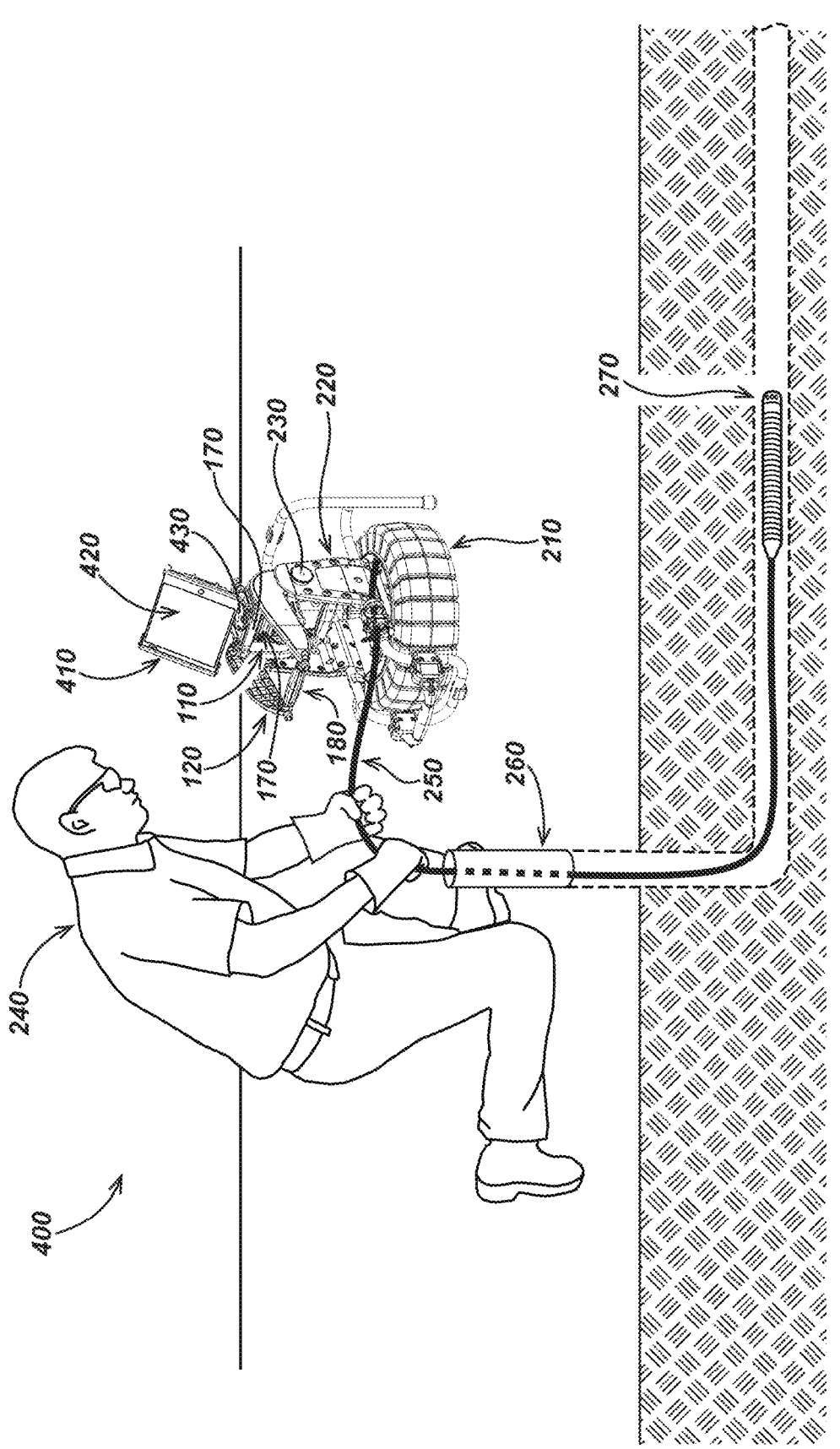
FIG. 4 is an embodiment illustrating a dockable camera reel and CCU system with a tablet and frame docked to a camera reel.

FIG. 4 is an exemplary embodiment of a dockable camera reel and tablet system 400 illustrating details of a tablet 420 inserted into tablet mounting device 410 which may be attached to inner frame element 110 via tablet docking apparatus 430. Outer frame element 120 may have a docking element (not shown) for attaching to drum-reel frame 220. Docking and undocking of inner frame element 110 may be controlled by drum-reel frame knob 230. FIG. 4 shows a user 240 deploying a camera cable 250 into a pipe or cavity 260. Camera cable 250 is connected to camera 270 which can be controlled with tablet 420, and pictures or images may be viewed via screen 150. The camera cable 250 and the camera 270 may be deployed and/or stored on drum-reel 210.

Figure 5:
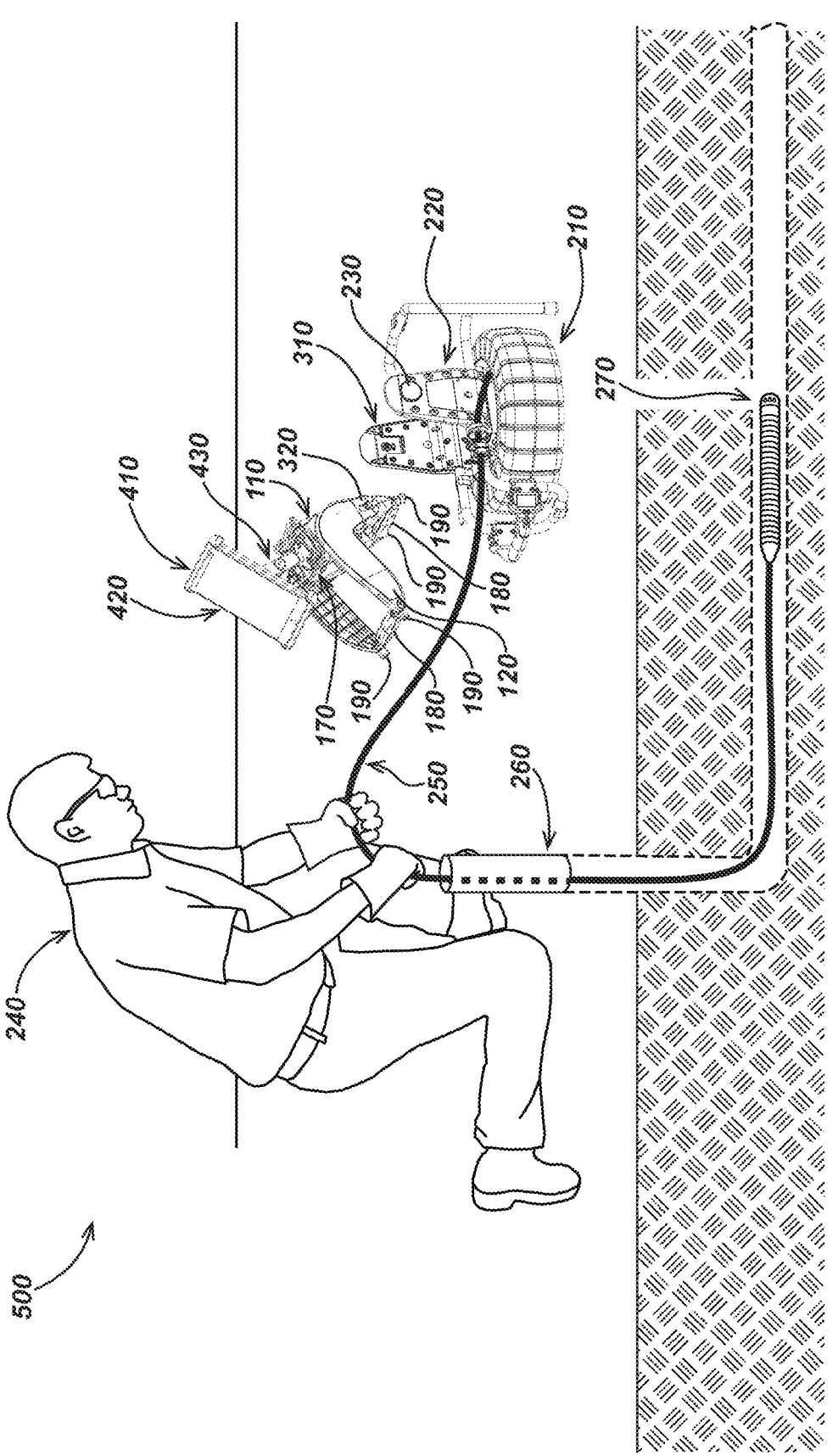
FIG. 5 is an embodiment illustrating a dockable camera reel and CCU system with a tablet and frame undocked from a camera reel.

FIG. 5 illustrates details of an exemplary embodiment of a dockable camera reel and tablet system 500 illustrating details of a tablet 420 inserted into tablet mounting device 420 attached to frame elements 110 and 120 in an undocked position, e.g. not attached to camera cable drum-reel 210. In this embodiment, if docking of frame elements 110 and 120 to cable drum-reel 210 is desired (with or without tablet 420 attached), drum-reel frame docking apparatus 310 may be configured to mate with outer frame docking apparatus 320.

Figures 6A, 6B:
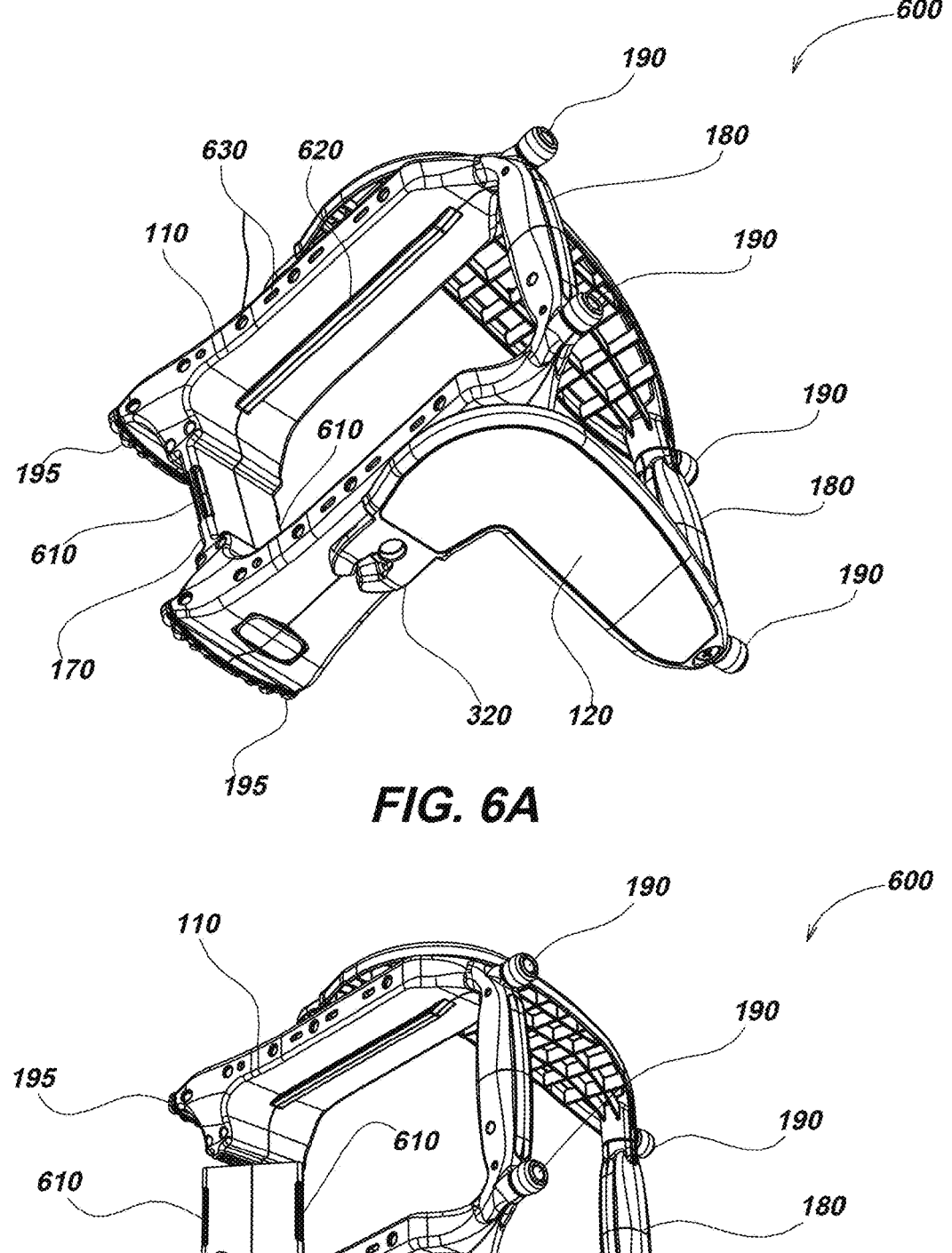
FIG. 6A is a detailed view of an embodiment of a CCU frame.
FIG. 6B is a detailed view of an embodiment of a CCU frame with a rotatable crossmember.

FIGS. 6A and 6B illustrate details of an exemplary embodiment of the CCU frame 600 showing both the inner and outer frame elements, 110 and 120 respectively, and showing a detailed view of crossmember 170. As shown in FIGS. 6A and 6B, crossmember 170 may include substantially symmetrical indentations or grooves 610 for receiving the CCU 140 via a docking apparatus (not shown) attached to CCU 140. As shown in FIG. 6A, in one embodiment crossmember 170 may be configured to remain stationary relative to inner frame element 110. In another embodiment, as shown in FIG. 6B, crossmember 170 may be configured be rotatable relative to inner frame element 110. In some embodiments, one or more rails 620 positioned on opposite sides of inner frame element 110, and/or mounting holes and/or slots positioned on the front face of frame element 110, may be provided for attaching a tablet, pad, or the like. Various size slots or holes 630 may be provided on one or both sides of inner frame element 110 for attaching one or more tablets, tablet mounting plates, or external accessories such as lights, connectors, etc.

Figure 7:
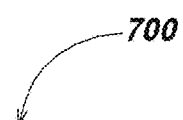
FIG. 7 is a side view illustrating details of a CCU docking apparatus embodiment.
Figure 7:
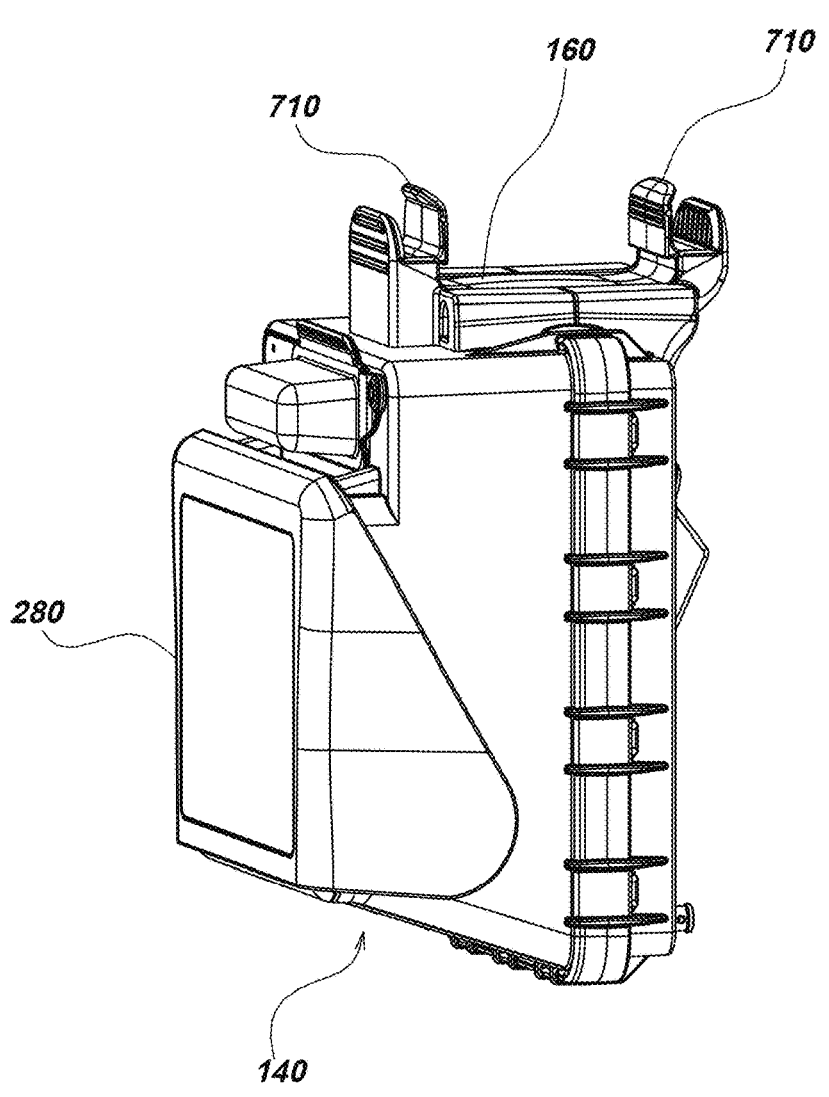

FIG. 7 illustrates details of an exemplary embodiment 700 of a CCU docking apparatus 160. In this embodiment, flexible members 710 may be configured to allow CCU 140 to be removably attached to crossmember 170 by mating with the indentations or grooves 610 (as shown in FIGS. 6A and 6B).

Figure 8A:
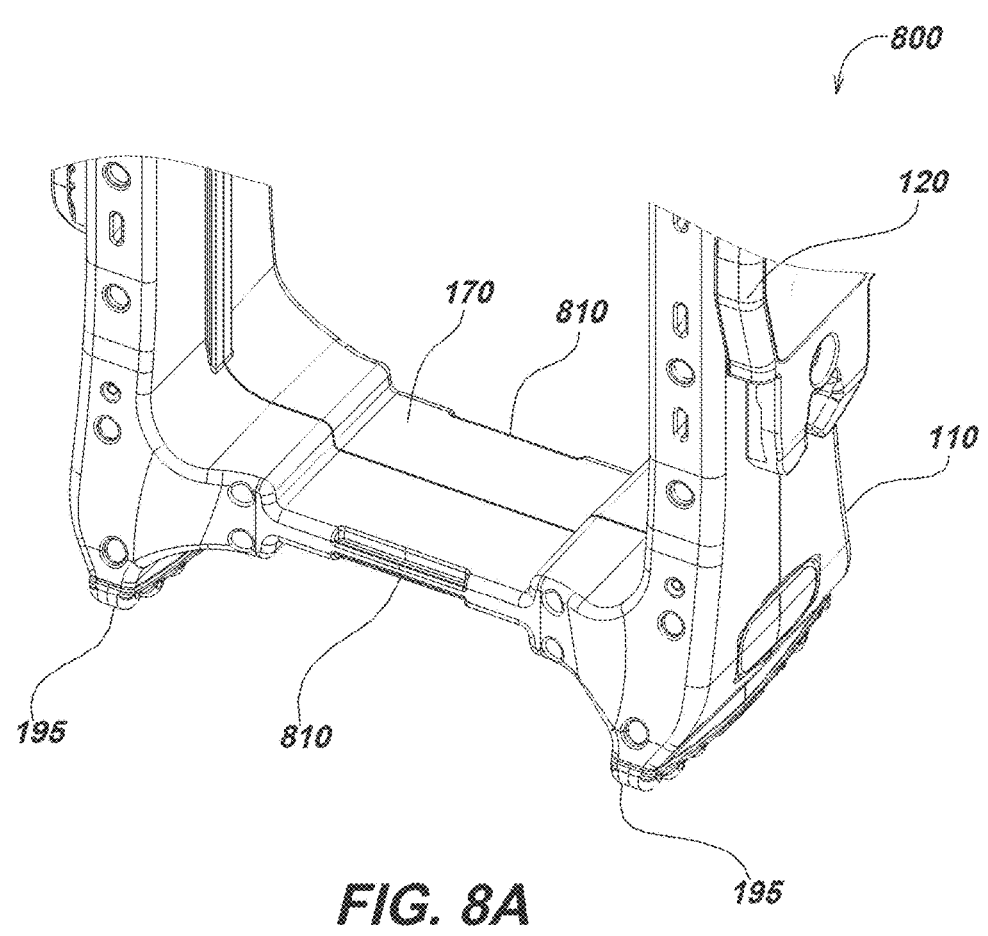
FIGS. 8A and 8B show different views illustrating details of a frame member configuration and slip resistant elements in an embodiment.
Figure 8B:
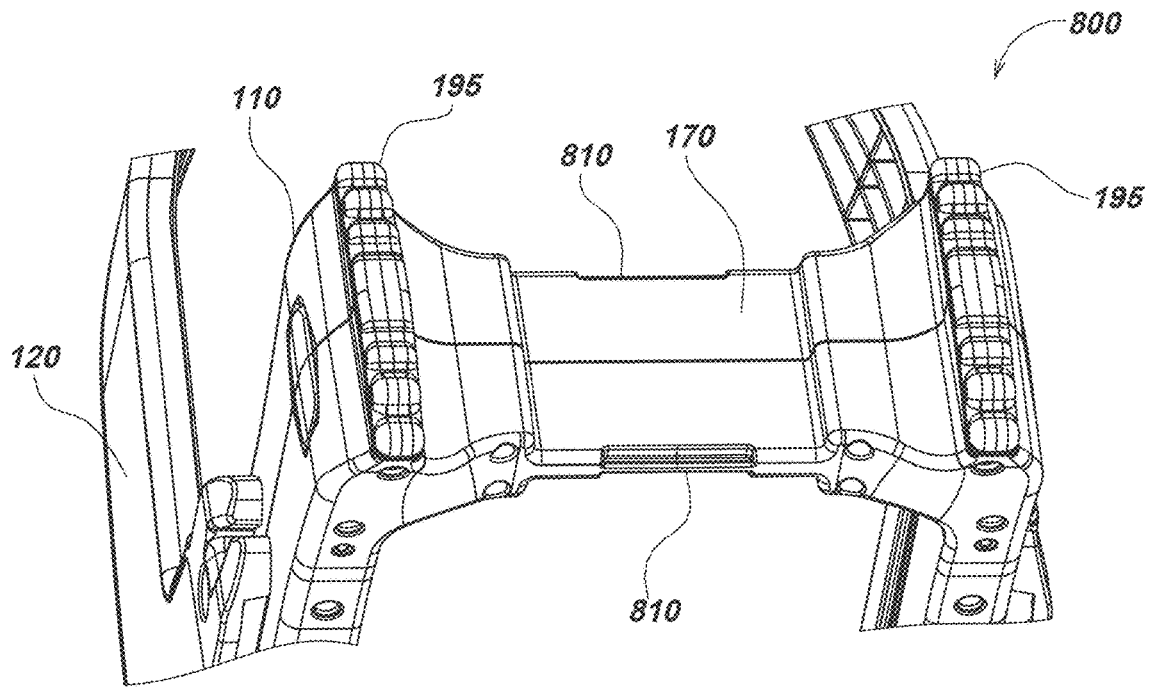

FIGS. 8A and 8B illustrate details of an exemplary embodiment 800 of crossmember 170 with indentations 810 for receiving flexible members 710 (as shown in FIG. 7).

In an embodiment, as shown in FIG. 8B, outer frame element 120 may be configured with slip resistant elements in the form of grooves 195.

Figure 9A:
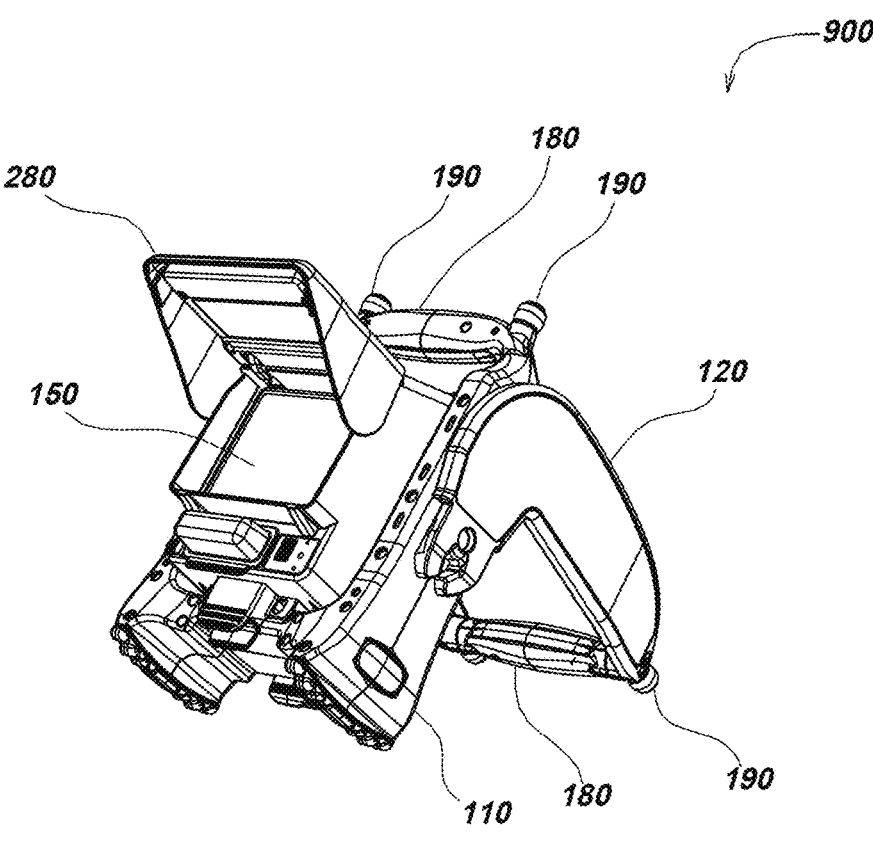
FIGS. 9A and 9B illustrate embodiments of possible CCU frame positions undocked from a camera reel (not shown).
Figure 9B:
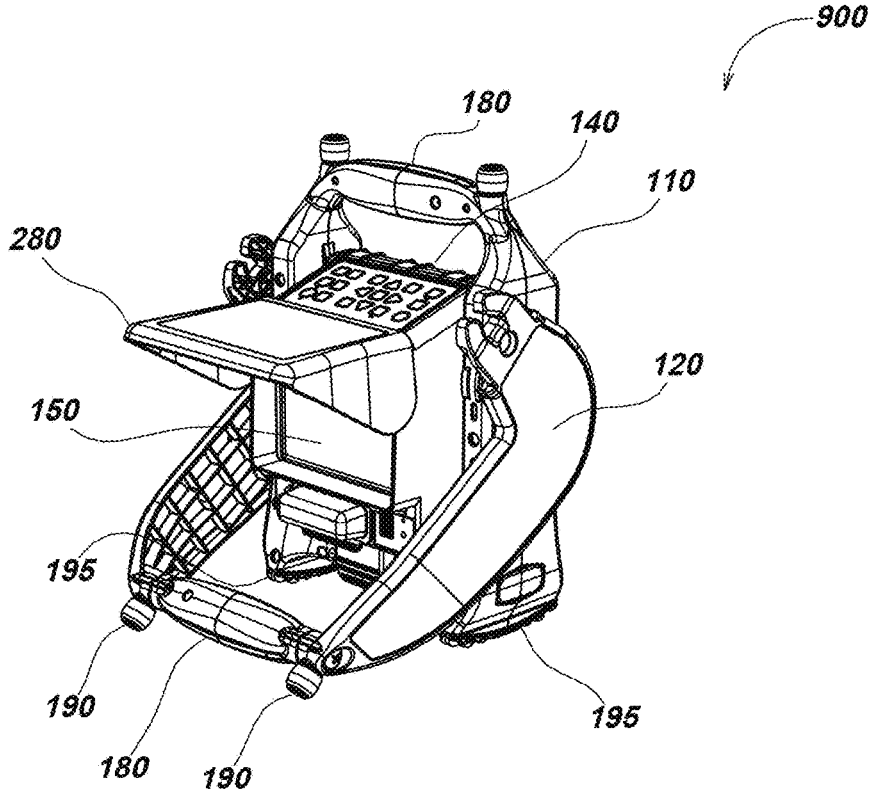

FIGS. 9A and 9B illustrate embodiments 900 of possible CCU 140 and frame elements 110 and 120 undocked from cable drum-reel 210 (not shown). In FIGS. 9A and 9B, CCU 140 is shown docked on the inside inner frame element 110.

Figure 10B:
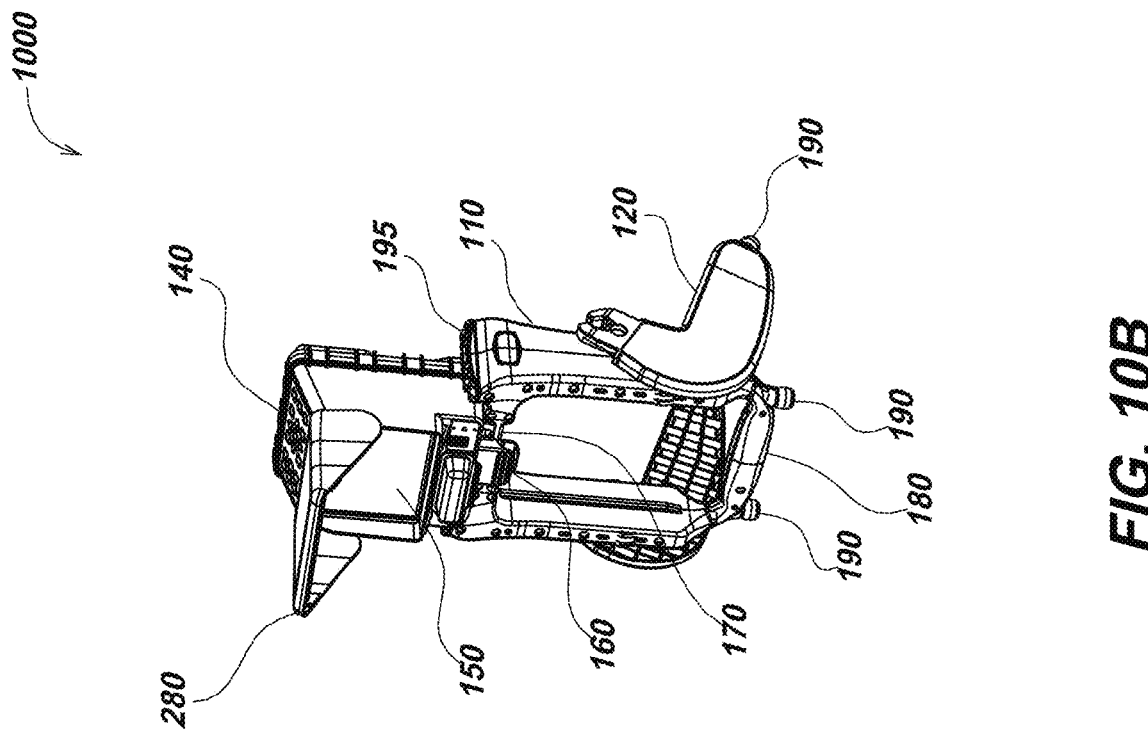
FIGS. 10A and 10B illustrate embodiments of possible CCU frame positions undocked from a camera reel (not shown).
Figure 10A:
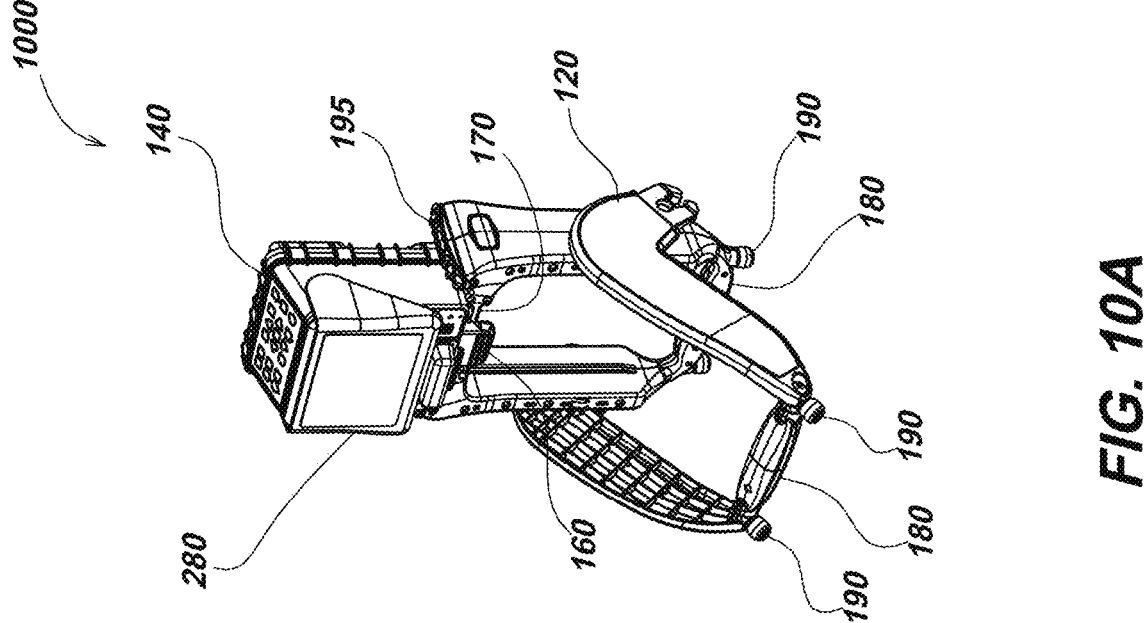

FIGS. 10A and 10B illustrate embodiments 1000 of possible CCU 140 and frame elements 110 and 120 undocked from cable drum-reel 210 (not shown). In FIGS. 10A and 10B, CCU 140 is shown docked on the outside of inner frame element 110.

Figure 11:
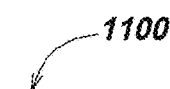
FIG. 11 illustrates a possible CCU frame position on a surface edge in an embodiment.
Figure 11:
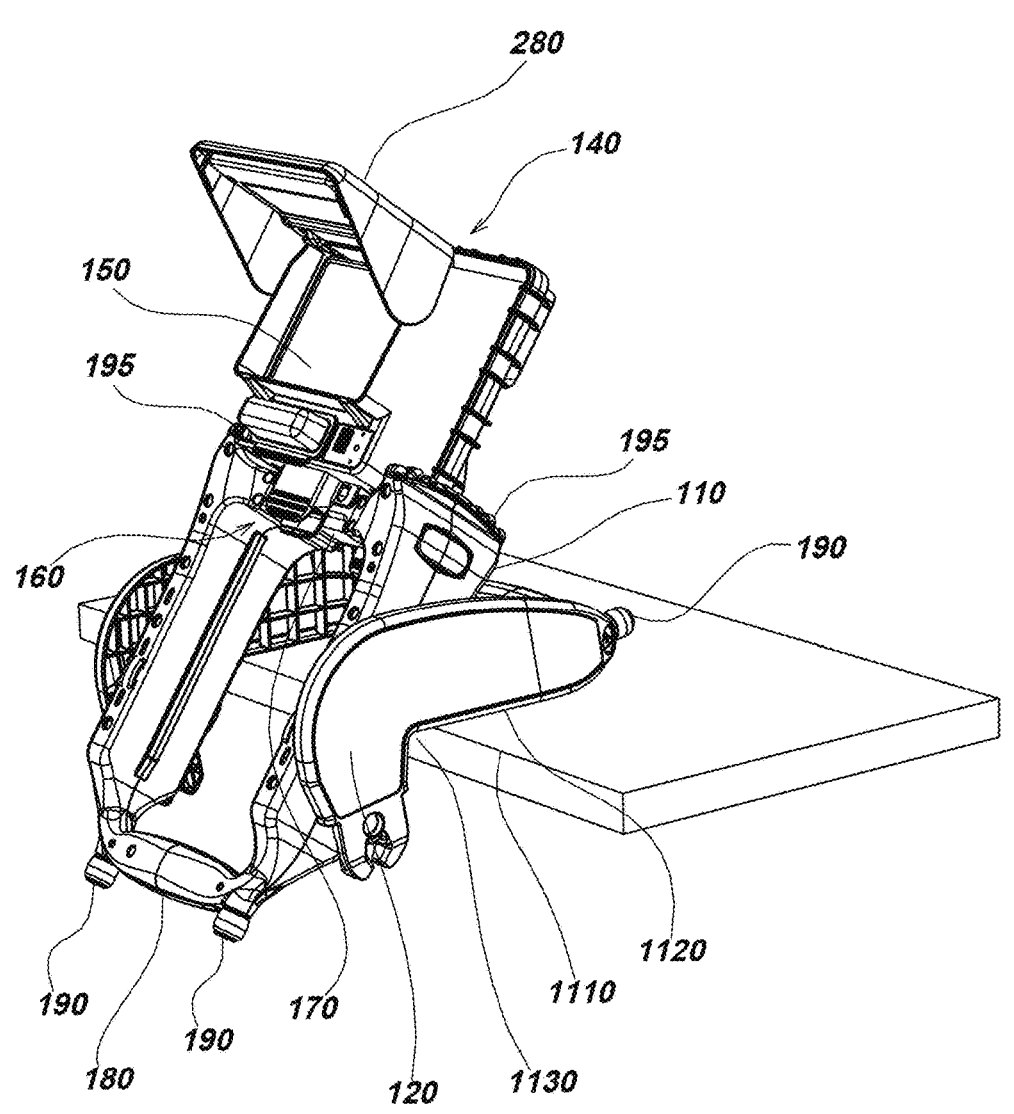

FIG. 11 illustrates details of an exemplary embodiment 1100 of a CCU 140 docked to inner frame element 110 via CCU docking apparatus 160. Outer frame element 120 can be placed on a surface edge 1110 by use of outer frame resting edge 1120. Additionally, outer frame element 120 may be angled to form a bend 1130 for facilitating a more secure base when placed on a surface edge 1110.

Figure 12:
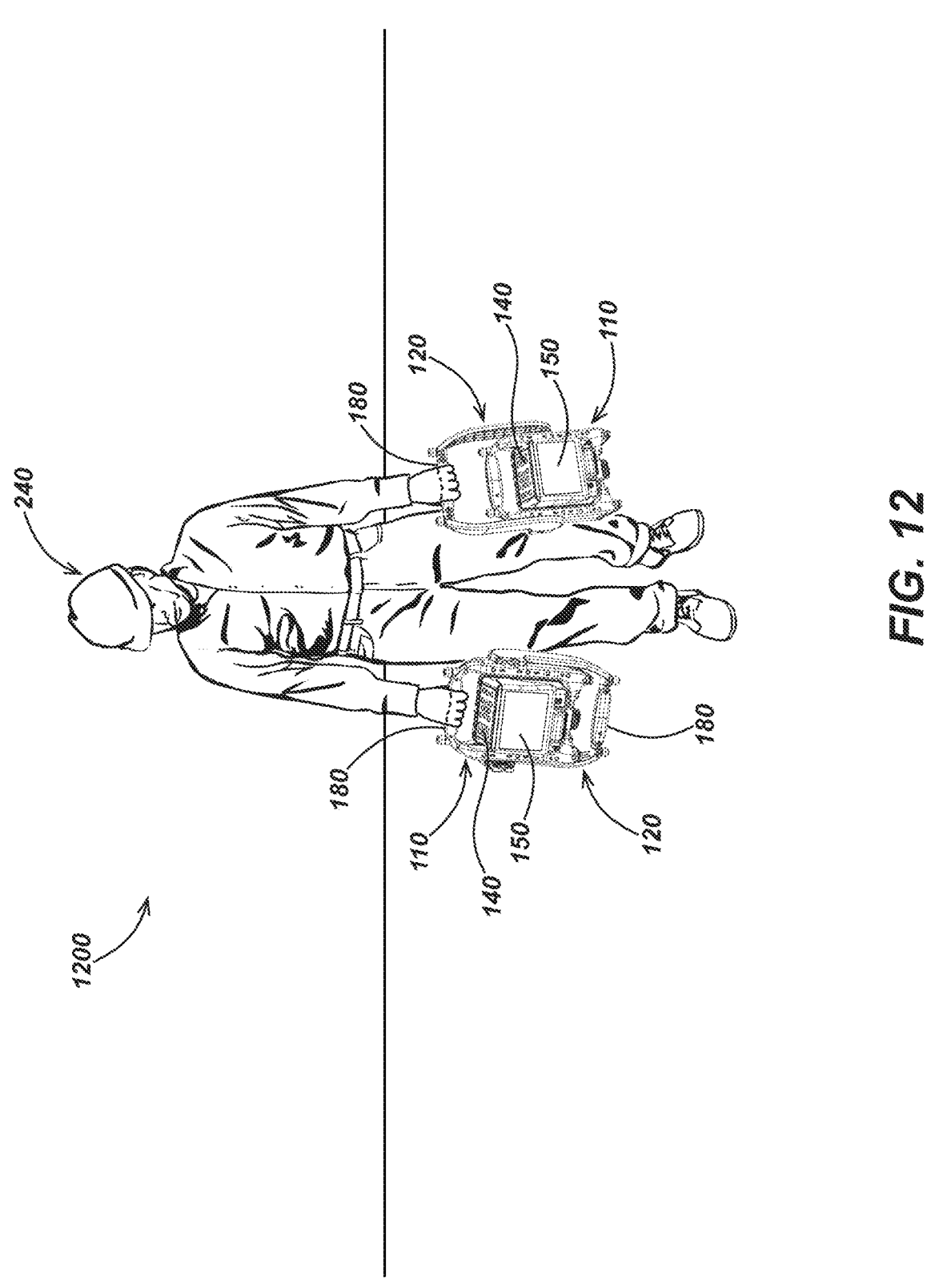
FIG. 12 illustrates a user carrying CCUs docked to frames in different configurations in an embodiment.

FIG. 12 illustrates details of an embodiment 1200 of a user 240 carrying CCUs 140 docked to frames 110 and 120 in different configurations. The user 240 is using handles 180 to facilitate carrying the CCUs 140.

Figure 13A:
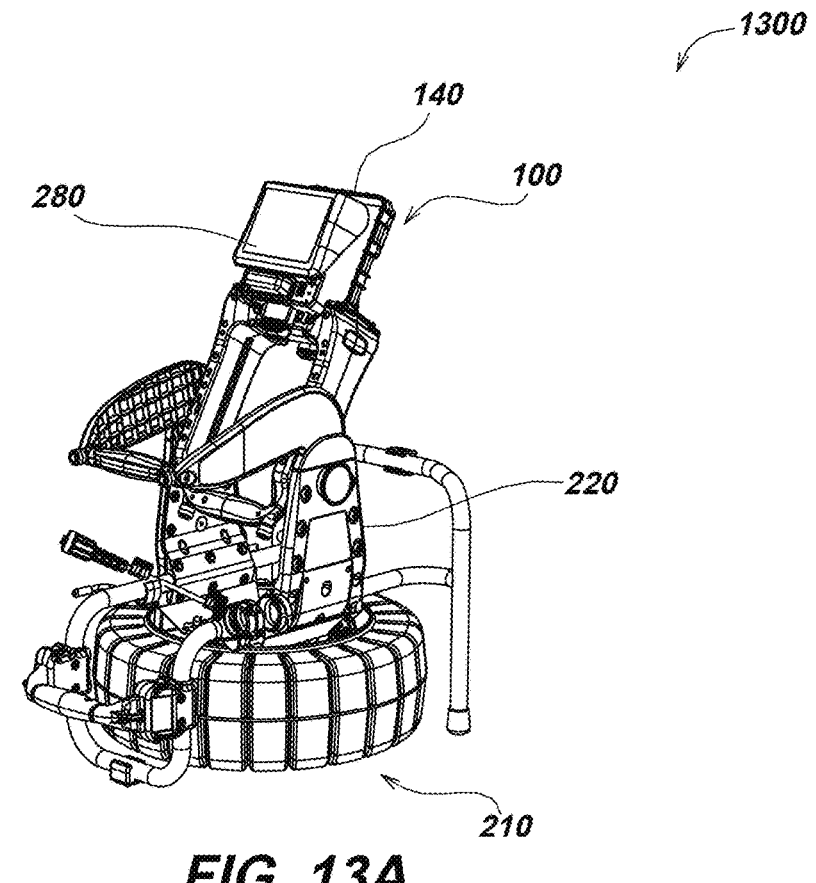
FIGS. 13A and 13B illustrate embodiments of possible CCU frame positions when docked to a camera reel.
Figure 13B:
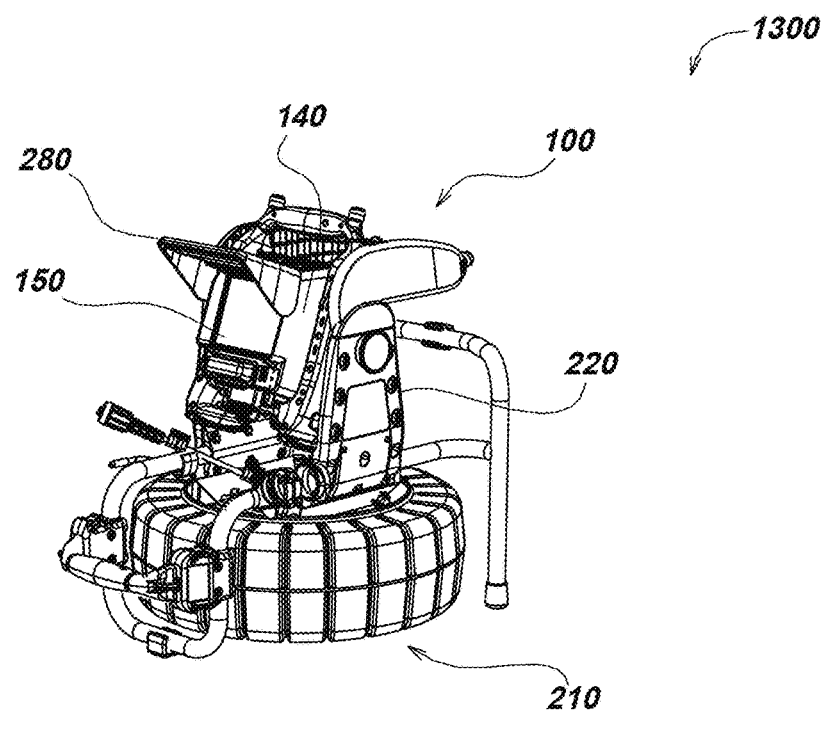

FIGS. 13A and 13B illustrate embodiments 1300 of a CCU 140 docked to a camera cable drum-reel 210. In FIG. 13A, sun visor/screen protector 280 is shown in a closed position, and in FIG. 13B, sun visor/screen protector 280 is shown in an open position.

Figure 14:
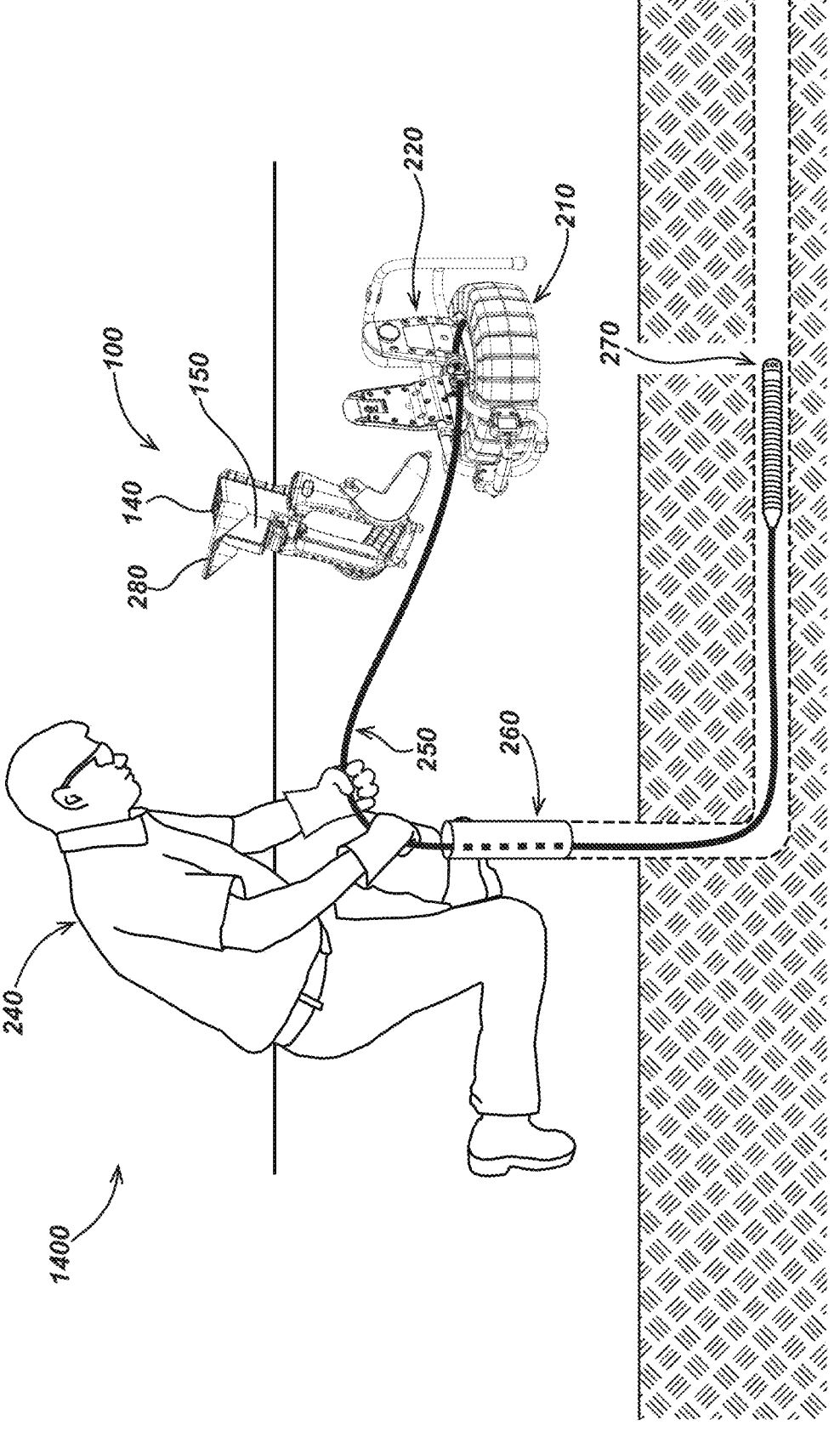
FIG. 14 is an embodiment illustrating a dockable camera reel and CCU system with a CCU and frame undocked from a camera reel.

FIG. 14 illustrates details of an exemplary embodiment of a dockable camera reel and CCU system 1400 illustrating details of a CCU 140 attached to frame elements 110 and 120 and in an undocked position, e.g. not attached to camera cable drum-reel 210.

Figures 15A, 15B:
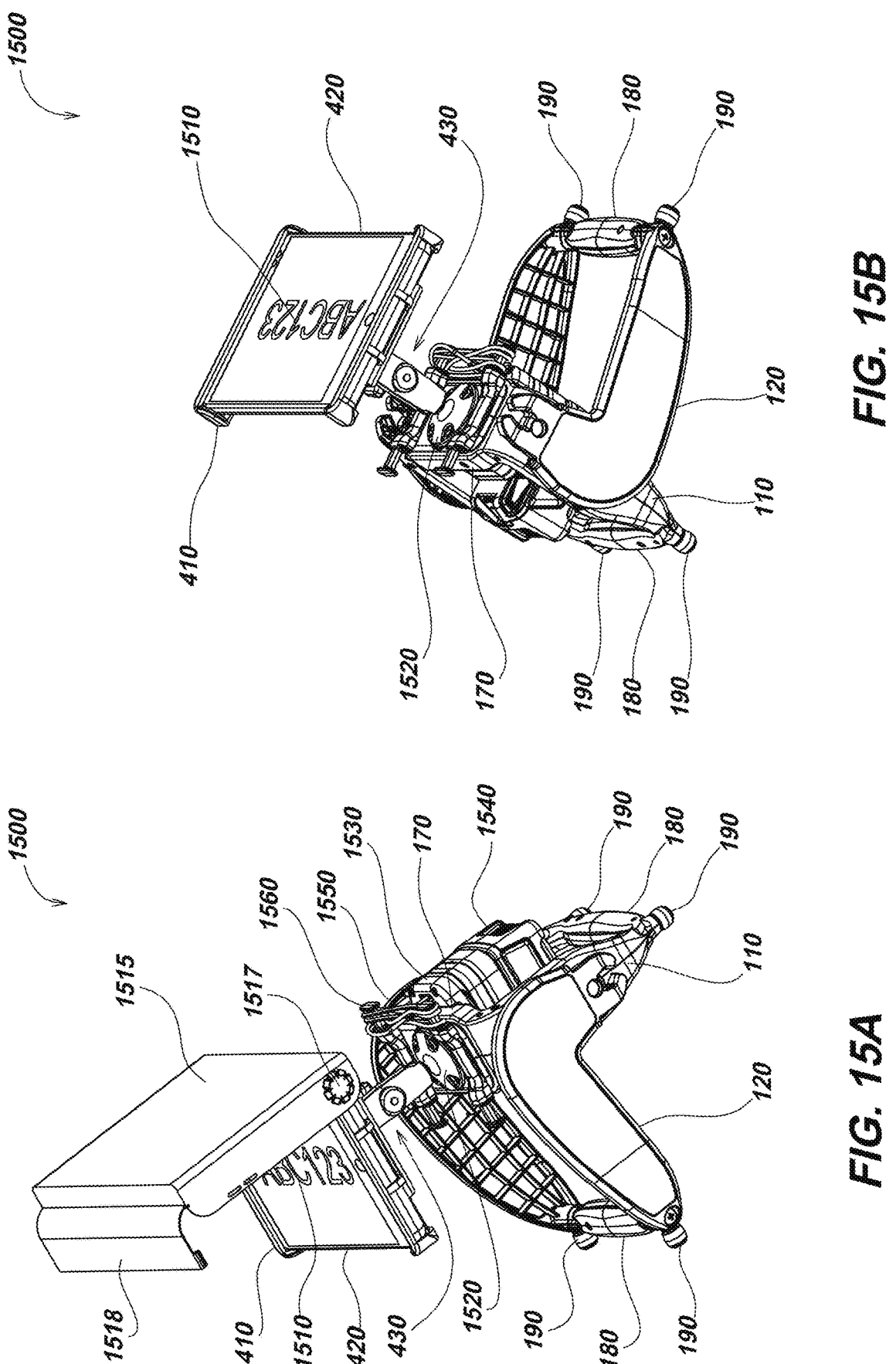
FIGS. 15A and 15B illustrate embodiments of tablet mounted via an adjustable mounting device to a frame which is undocked from a camera reel (not shown).

FIGS. 15A and 15B illustrate details of an exemplary embodiment 1500 of a tablet 420 held in place with tablet mounting device 410 which is docked to inner frame element 110 via tablet docking apparatus 430. Frame elements 110 and 120 are undocked from cable drum-reel 210 (not shown). Tablet mounting device 410 may be attached to crossmember 170 using tablet docking apparatus 430. In some embodiments, tablet docking apparatus 430 may include ball connector base plates 1520.

A displayed image 1510 is shown on tablet 420. Although a tablet 420 is shown, in some embodiments tablet 420 may be a tablet, pad, laptop, smartphone, or the like. Tablet 420 may include an accelerometer or other device/technology to allow a displayed image to automatically orient itself in the proper upright viewing direction of a user. Therefore, a user, in some embodiments, may be able to simply flip over and/or adjust one or both frame elements and would be able to automatically see the correct display without having to adjust or reorient the tablet, pad, laptop, smartphone, or the like, as can be shown in FIGS. 15A and 15B. Some embodiments may include a battery 1540 which may be attached with a battery docking mechanism 1530 to cross-member 170 to power the tablet 420 via a cable 1550. Docking mechanism 1530 may be configured to allow the battery 1540 to be removably replaceable. A cable storage element 1560 may be provided in some embodiments. Battery 1540 may be a power tool type battery or battery pack, or any other type of battery or battery pack, which may in some embodiments be rechargeable. In some embodiments, power may be provided wirelessly.

In some embodiments, a sun visor/screen protector 1515 may be provided. The example sun visor/screen protector 1515 is shown open (up position) but may be configured to adjust to different angles or positions, e.g. open (up position) or closed (down position). The sun visor/screen protector 1515 may be positioned continuously with respect to the display screen of tablet 420, a hinge 1517 may be provided for this purpose. In some embodiments, a locking mechanism 1518 may be provided to keep visor/screen protector 1515 in a closed position. In some embodiments, when the sun visor/screen protector 1515 is in a closed position, it provides an enclosure from which the tablet may not be removed in order to protect and secure tablet 420.

Figures 15C, 15D, 15E:
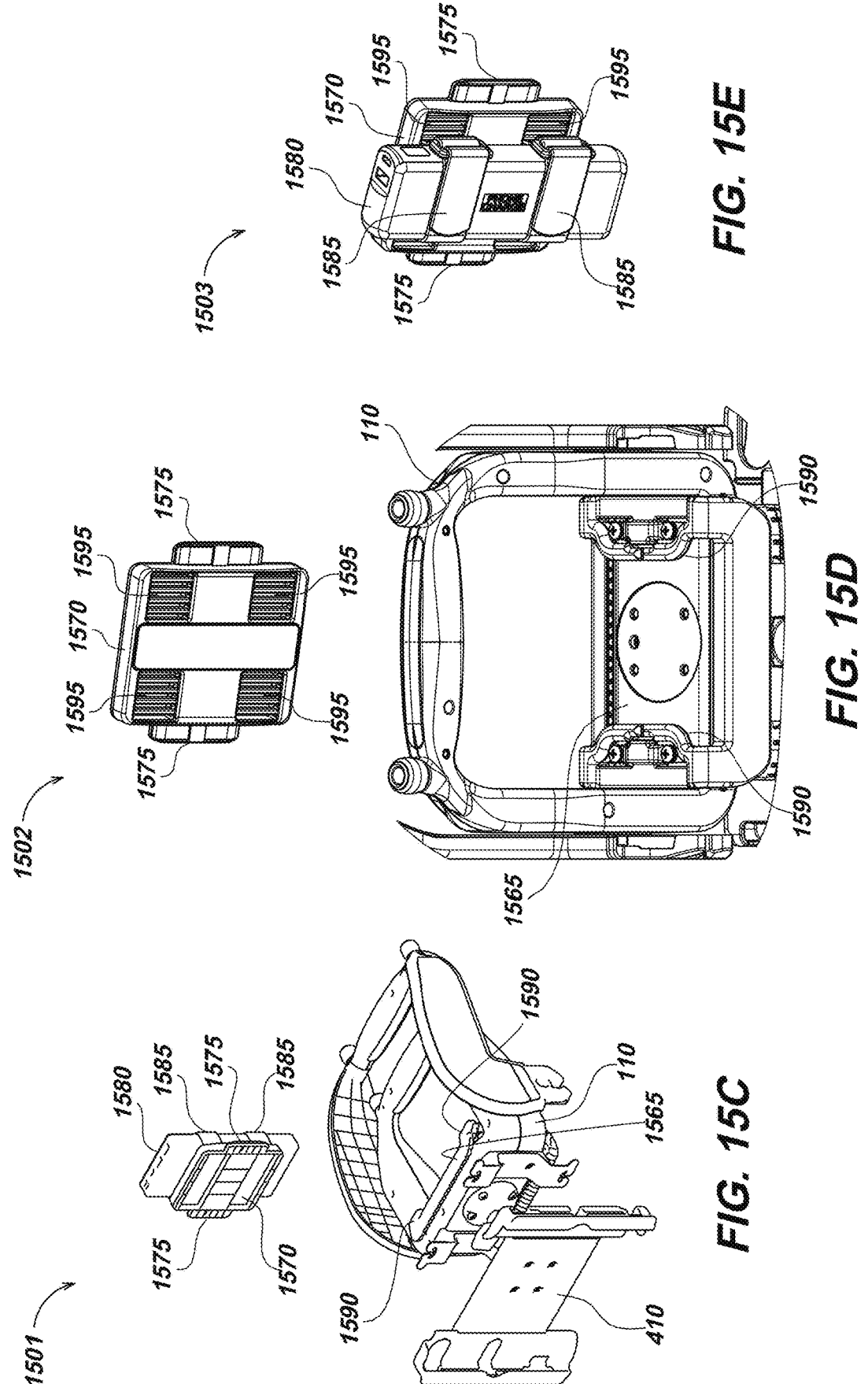
FIGS. 15C, 15D and 15E illustrate an embodiment with a battery mount for removably attaching a battery and details of specific components.

FIG. 15C illustrates details of an exemplary embodiment 1501 shown configured with a battery mount 1565 attached to the inside of frame 110. Battery mount 1565 may be configured to mate with battery plate 1570 which may have plate tabs 1580 configured to allow it to be removably attached to battery mount 1565 which may include one or more ribbed slots 1590 to allow it to receive battery plate 1570 via the plate tabs 1575. Battery plate 1570 may be permanently affixed to a battery 1580 or configured to allow battery 1580 to be removably attached.

In some embodiments, fastening straps 1585 may be provided. In one embodiment, fastening straps 1585 may be hook and loop type straps. Battery mount 1565, as well as battery plate 1570, may each be configured in different shapes and sizes, and may be constructed of various materials well known in the art. Battery plate 1570 may be configured with multiple strap locations to allow fastening straps 1585 of varying sizes to be attached, thereby facilitating the use of different size batteries or battery banks 1580. In some embodiments, if a battery 1580 needs to be removed for maintenance or charging, it could be removed from battery mount 1565 via battery plate 1570 and remain attached thereto, or may be unstrapped from battery plate 1570 to allow access to the battery 1580. Battery 1580 may be a single battery, multiple batteries (a battery bank), a battery pack, or the like.

FIG. 15D shows a detailed view of an exemplary embodiment 1502 of a battery mount 1565 with battery ribbed slots 1590 configured to mate with battery plate 1570 via battery plate tabs 1575. In some embodiments, battery plate 1570 may be configured with one or more slots allowing different size battery straps 1585 to attach to different size batteries 1580 by positioning the straps 1585 through different slots 1575.

FIG. 15E shows a detailed view 1503 of a battery plate 1570 configured to hold a battery 1580 with fastening straps 1585. The fastening straps 1585 may be routed through slots 1595 and around the battery 1580. Routing fastening straps 1585 through different slots 1595 allows different size and shaped batteries to be used. Once battery plate 1570 is secured, one or more batteries 1580 may be attached with battery plate tabs 1575 to battery mount 1565 (FIGS. 15C and 15D).

Figure 16A:
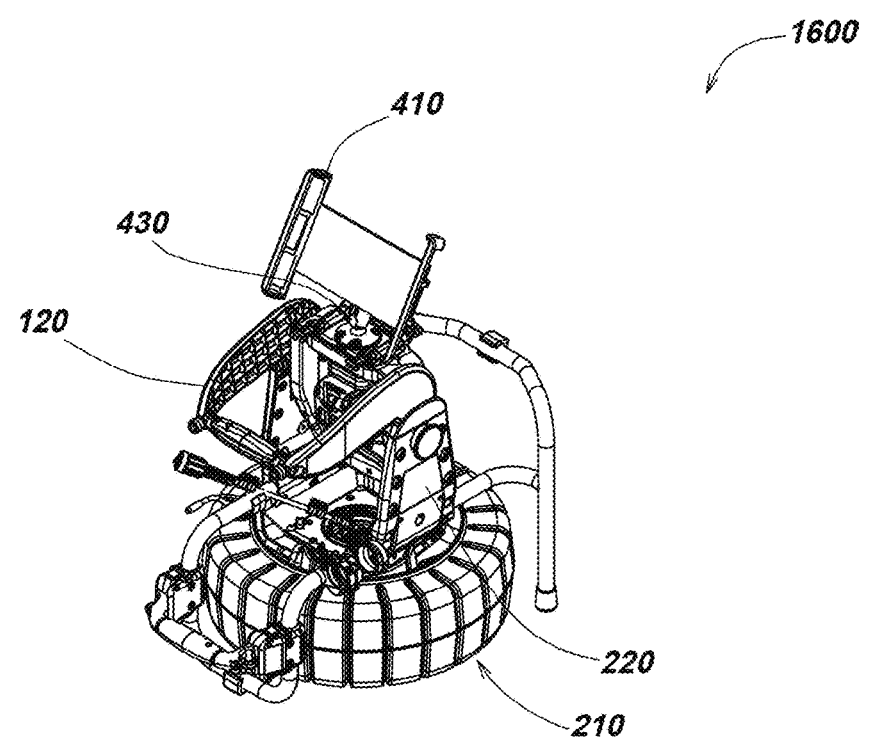
FIGS. 16A and 16B are illustrations of an adjustable mounting device docked to a frame that is docked to a camera reel in certain embodiments.
Figure 16B:
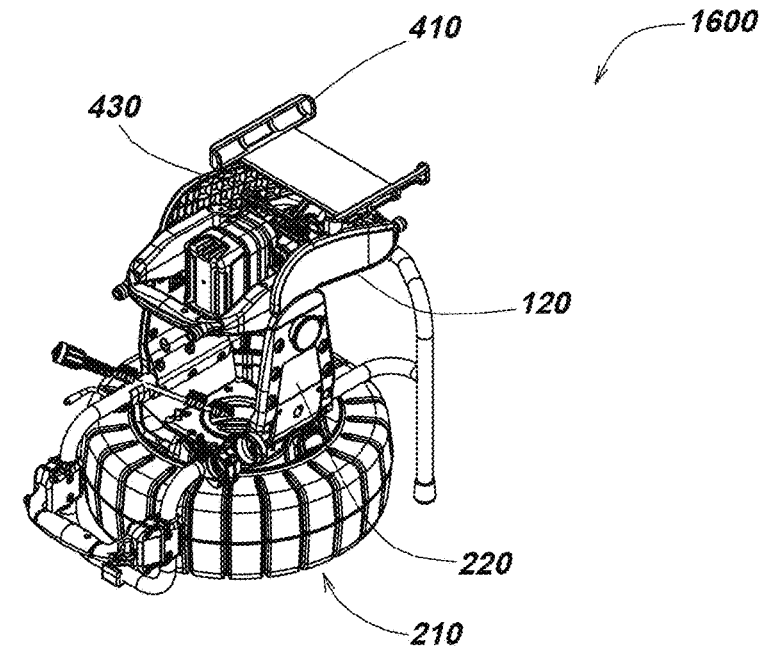

FIGS. 16A and 16B illustrate embodiments 1600 of a tablet mounting device 410 docked to a camera cable drum-reel 210.

Figure 17:
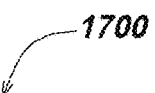
FIG. 17 is a detailed view of an adjustable mounting device with ball receiving docking apparatus in an embodiment.
Figure 17:
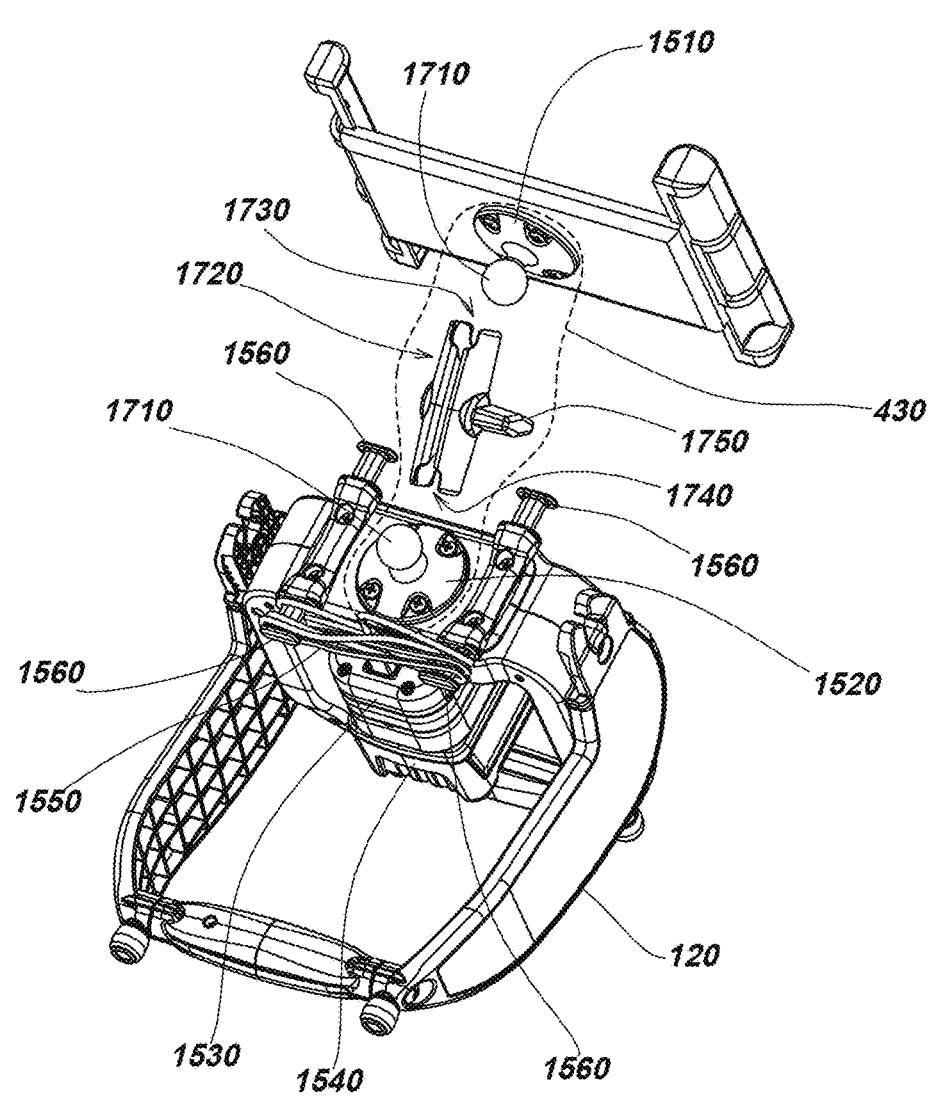

FIG. 17 illustrates details of an exemplary embodiment of a tablet mounting device 1700. Tablet mounting device 1700 may include ball connector baseplates 1520 with attached docking ball connectors 1710 which mate with a ball receiving connector 1720. Ball receiving connector 1720 may have two halves which when tightened form a closed tube with opposing end ball receiving connectors tablet side end and frame side end 1730 and 1740, respectively. A ball fastener adjuster 1750 may be provided for connecting the ball receiving connector 1720 to ball receiving connectors 1730 and 1740 to facilitate docking of a tablet mounting device 1700. These components may be collectively referred to as a ball joint arm.

In some embodiments, the ball joint arm may be replaced with a friction hinge arm with an inner channel which provides a conduit for conductors for power delivery from battery 1540 to tablet 420. In other embodiments, tablet mounting device 1700 may be replaced with a low profile CCU that may be removably connected from the friction hinge arm.

Figure 18:
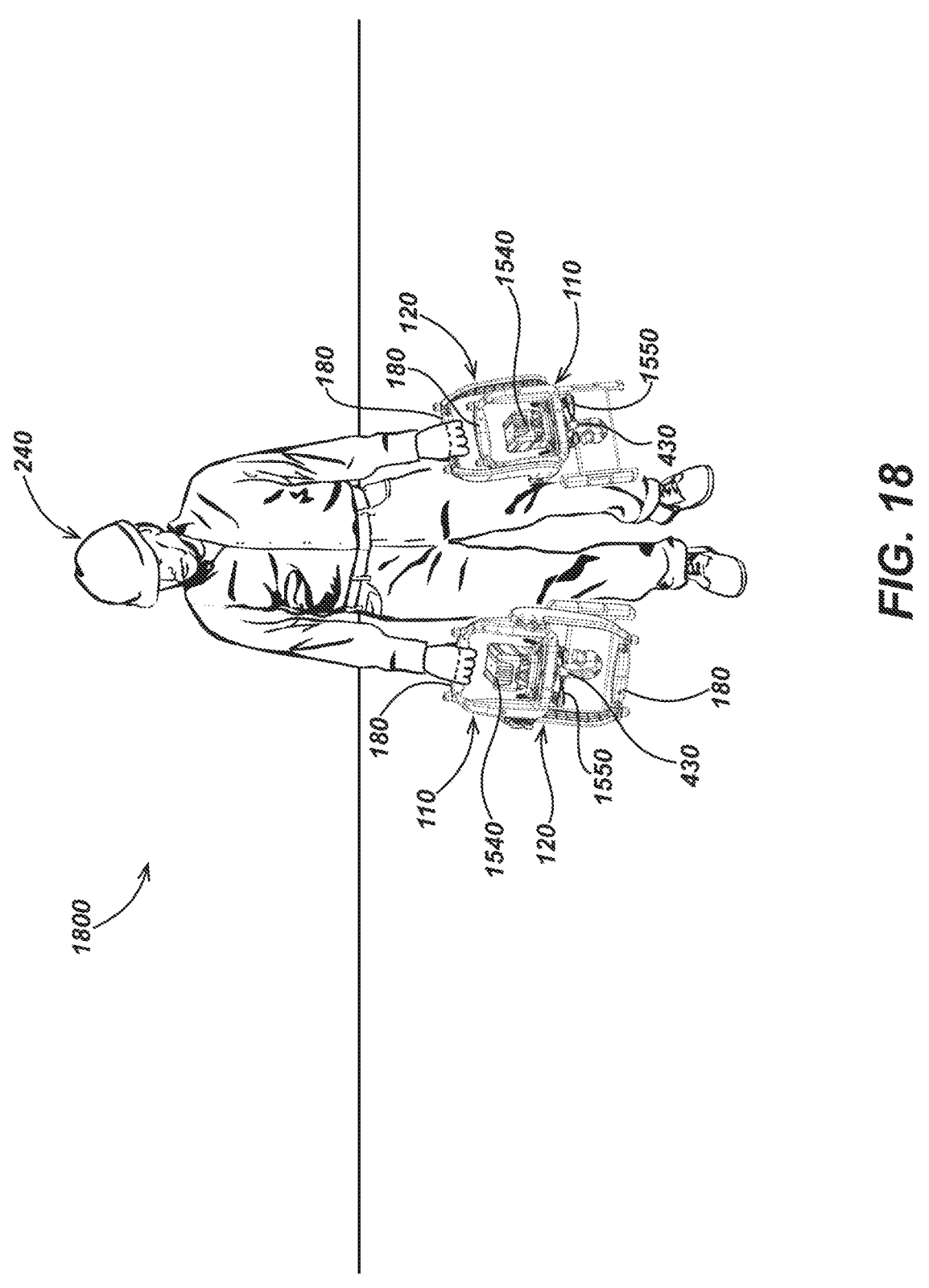
FIG. 18 illustrates a user carrying adjustable mounting devices docked to frames in different configurations in an embodiment.

FIG. 18 illustrates details of an embodiment 1800 of a user 240 carrying tablet docking apparatus 430 docked to frames 110 and 120 in different configurations. The user 240 is using handles 180 to facilitate carrying the tablet docking apparatus 430.

The various mechanical components described previously herein and shown in the accompanying drawings may be fabricated from metal materials, such as aluminum, steel, stainless steel, or other metals, and/or may include plastic materials, ceramic materials, or other materials depending on the application of the component in the associated device. Other similar or equivalent materials may be used in alternate embodiments depending on the specific application and environmental requirements.

The present invention is not intended to be limited to the aspects shown herein, but is to be accorded the full scope consistent with the Specification and Drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use various embodiments of the present disclosure. Various modifications to these aspects will be readily apparent to those skilled in the art, and the generic principles defined herein may be applied to other aspects without departing from the spirit or scope of the invention. Therefore, the presently claimed invention is not intended to be limited to the aspects and details shown herein, but is to be accorded the widest scope consistent with the following claims and their equivalents.

We claim:

1. An apparatus for storing, carrying, and positioning a camera control unit (CCU) including a display, comprising:
    a first docking apparatus attached to the CCU comprising a flexible member;
    a first closed inner frame element comprising a first handle positioned at a proximate end of the first frame element and a crossmember positioned at a second distal end of the the first frame element opposite the first handle, wherein the crossmember is positioned substantially parallel to the first handle, wherein the cross member is configured with a plurality of slip resistant components which includes one or more rubber strips, feet, or pads and/or extrusions, grooves, treads, or the like for contacting a surface, wherein the crossmember is configured with substantially symmetrical indentations or grooves for receiving the CCU via the flexible member, wherein the display is removably attached via the flexible member in either a forward or backward direction on top of the crossmember, or in either the forward or backward direction on the bottom of the crossmember; and a second substantially u-shaped open frame element with a second handle attached at one end of the second frame element, wherein the first inner frame element is positioned inside the second outer frame element,
    at least one rotating element to connect the first and second frame elements, wherein the rotating element is configured such that the first and second frame elements are free to rotate 360 degrees relative to each other, wherein the rotating elements have a frictional component to retain the first and second frame elements in an angled or upright self-supporting position,
    wherein the second frame element is configured with a second docking apparatus comprising two downwardly protruding prongs for removably docking the apparatus to a drum-reel configured with prong receiving slots; and
    at least one slip resistant component attached to the first handle and at at least one slip resistant component attached to the second handle, wherein each slip resistant component is configured to prevent or reduce movement of the first and second frame elements once positioned on the surface,
    wherein an attached CCU is put in a free standing position for viewing by adjusting the position of the first frame element and the second frame element relative to each other, wherein the first handle and second handle provide a base for the display when placed on the surface.

2. An apparatus for storing, carrying, and positioning a camera control unit (CCU) including a display, comprising:
    an adjustable mounting device for removably attaching a tablet, pad, laptop, smartphone, or the like;
    a first docking apparatus;
    a first closed inner frame element comprising a first handle positioned at a proximate end of the first frame element and a crossmember positioned at a second distal end of the the first frame element opposite the first handle, wherein the crossmember is positioned substantially parallel to the first handle, wherein the cross member is configured with a plurality of slip resistant components which includes one or more rubber strips, feet, or pads and/or extrusions, grooves, treads, or the like for contacting a surface, wherein the crossmember is attached to a baseplate attached to a ball for receiving the adjustable mounting device via the first docking apparatus wherein the tablet, pad, laptop, smartphone, or the like is removably attached via adjustable mounting device and oriented and positioned in multiple positions and orientations including up, down, forward, backward, angled, and the like; and a second substantially u-shaped open frame element with a second handle attached at one end of the second frame element, wherein the first inner frame element is positioned inside the second outer frame element,
    at least one rotating element to connect the first and second frame elements, wherein the rotating element is configured such that the first and second frame elements are free to rotate 360 degrees relative to each other, wherein the rotating elements have a frictional component to retain the first and second frame elements in an angled or upright self-supporting position,
    wherein the second frame element is configured with a second docking apparatus comprising two downwardly protruding prongs for removably docking the apparatus to a drum-reel configured with prong receiving slots; and
    at least one slip resistant component attached to the first handle and at at least one slip resistant component attached to the second handle, wherein each slip resistant component is configured to prevent or reduce movement of the first and second frame elements once positioned on the surface,
    wherein an attached tablet, pad, laptop, smartphone, or the like is put in a free standing position for viewing by adjusting the position of the first frame element and the second frame element relative to each other, wherein the first handle and second handle provide a base for the display when placed on the surface.

3. A video inspection system, comprising:
    a first frame element with at least one handle and a second frame element with at least one handle;
    at least one rotating element to connect the first and second frame elements, wherein the rotating element is configured such that the first and second frame elements are free to rotate 360 degrees relative to each other, wherein the rotating elements have a frictional component to retain the first and second frame elements in an angled or upright self-supporting position;
    an adjustable arm comprising a proximal end and a distal end; and
    a tablet mounting device, wherein the proximal end of the adjustable arm is connected to at least one of the first frame element or the second frame element, and the distal end of the adjustable arm is connected to the tablet mounting device.

4. The video inspection system of claim 3, wherein the tablet mounting device includes at least two opposing sides, wherein the opposing sides are configured to removably accept and hold a display or computing device.

5. The video inspection system of claim 4, wherein the computing device comprises at least one of a tablet, pad, laptop, cellular phone, or smart phone.

6. The video inspection system of claim 3, wherein the adjustable arm comprises at least one docking ball connector configured to mate with a ball receiving connector on one or both of the proximal or distal ends of the adjustable arm.

7. The video inspection system of claim 3, wherein the adjustable arm comprises a friction hinge on one or more or both of the proximal or distal ends of the adjustable arms.

8. The video inspection system of claim 7, wherein the adjustable arm includes an inner channel which provides a conduit for wiring or conductors.

9. The video inspection system of claim 3, further comprising a battery holder configured to be removably attachable to a battery baseplate.

10. The video inspection system of claim 9, wherein the battery baseplate includes two or more slots and one or more straps, wherein the one or more straps are threaded around the baseplate through two or more slots, and wherein the straps hold one or more batteries in place.

11. The video inspection system of claim 10, wherein each of the one or more straps have a first end and a second end, wherein the first and second ends are connectable via hook and loop fasteners.

12. The apparatus of claim 1, wherein the crossmember is rotatable relative to the first inner frame element.

13. The apparatus of claim 1, wherein the second frame element is curved or angled to allow the apparatus to rest on an edge of a table, desk, counter, or ledge.

14. The apparatus of claim 1, further comprising a latch indicator configured to indicate whether the second docking apparatus is in a locked state or a released state.

15. The apparatus of claim 1, wherein the first docking apparatus is configured to automatically reset into a docking-ready state upon removal of the CCU.

16. The apparatus of claim 2, further comprising a battery mount attached to the first inner frame element and configured to removably receive a battery for powering the tablet, pad, laptop, smartphone, or the like.

\* \* \* \* \*